United States Patent
Naito et al.

(10) Patent No.: US 10,968,135 B2
(45) Date of Patent: Apr. 6, 2021

(54) LEAD-FREE GLASS COMPOSITION, AND GLASS COMPOSITE MATERIAL, GLASS PASTE, AND SEALING STRUCTURE BODY CONTAINING THE SAME

(71) Applicant: Showa Denko Materials Co., Ltd., Tokyo (JP)

(72) Inventors: Takashi Naito, Tokyo (JP); Taigo Onodera, Tokyo (JP); Tatsuya Miyake, Tokyo (JP); Akitoyo Konno, Tokyo (JP); Shinichi Tachizono, Tokyo (JP); Yuji Hashiba, Tokyo (JP); Keita Yuguchi, Tokyo (JP); Takahiro Ikabata, Tokyo (JP); Masaharu Matsuura, Tokyo (JP)

(73) Assignee: Showa Denko Materials Co., Ltd., Tokyo (JP)

( * ) Notice: Subject to any disclaimer, the term of this patent is extended or adjusted under 35 U.S.C. 154(b) by 0 days.

(21) Appl. No.: 16/424,854

(22) Filed: May 29, 2019

(65) Prior Publication Data

US 2019/0367405 A1    Dec. 5, 2019

(30) Foreign Application Priority Data

May 30, 2018  (JP) .............................. JP2018-103362

(51) Int. Cl.
  *C03C 3/12* (2006.01)
  *C03C 8/24* (2006.01)
  *C03C 10/00* (2006.01)
(52) U.S. Cl.
  CPC .............. *C03C 3/122* (2013.01); *C03C 8/24* (2013.01); *C03C 10/00* (2013.01); *C03C 2214/20* (2013.01)

(58) Field of Classification Search
  CPC ................................. C03C 8/24; C03C 3/122
  See application file for complete search history.

(56) References Cited

U.S. PATENT DOCUMENTS

| 8,470,723 | B2 * | 6/2013 | Naito | C03C 8/24 501/24 |
| 9,815,735 | B2 * | 11/2017 | Miyazawa | C03C 3/122 |
| 2015/0187510 | A1 * | 7/2015 | Naito | H01G 9/20 428/76 |
| 2016/0060158 | A1 * | 3/2016 | Naito | C03C 17/04 428/34 |
| 2016/0168017 | A1 * | 6/2016 | Miyazawa | C03C 8/24 427/58 |
| 2017/0349479 | A1 * | 12/2017 | Yanagisawa | C03C 3/21 |

FOREIGN PATENT DOCUMENTS

| JP | 2010-184852 A | 8/2010 |
| JP | 2012-96993 A | 5/2012 |

* cited by examiner

*Primary Examiner* — Karl E Group
(74) *Attorney, Agent, or Firm* — Crowell & Moring LLP

(57) ABSTRACT

The lead-free glass composition contains vanadium oxide, tellurium oxide, alkali metal oxide, iron oxide, barium oxide, and tungsten oxide while containing substantially no phosphorus oxide, and further contains at least one of additional components including yttrium oxide, lanthanum oxide, cerium oxide, erbium oxide, ytterbium oxide, aluminum oxide, and gallium oxide. A content of the tellurium oxide is equal to or more than 25 mol %, and equal to or less than 43 mol % in terms of oxide $TeO_2$. A content of the alkali metal oxide is equal to or more than 4 mol %, and equal to or less than 27 mol % in terms of oxide $R_2O$ (R: alkali metal element).

18 Claims, 16 Drawing Sheets

($T_G$: TRANSITION TEMPERATURE, $A_T$: DEFORMATION TEMPERATURE)

EVACUATION

EVACUATION SEALING

LEAD-FREE GLASS COMPOSITION, AND GLASS COMPOSITE MATERIAL, GLASS PASTE, AND SEALING STRUCTURE BODY CONTAINING THE SAME

CLAIM OF PRIORITY

The present application claims priority from Japanese Patent application serial No. 2018-103362, filed on May 30, 2018, the content of which is hereby incorporated by reference into this application.

TECHNICAL FIELD

The present invention relates to a lead-free glass composition, and a glass composite material, a glass paste, and a sealing structure body containing the lead-free glass composition.

BACKGROUND

A vacuum heat insulating multilayer glass panel applied to the window glass or the like, a display panel such as a plasma display panel, an organic EL display panel, and a fluorescent display tube, and electric/electronic components such as a crystal resonator, an IC ceramic package, and a semiconductor sensor are formed through sealing and adhesion using the glass composite material that contains the low-melting point glass composition and ceramic particles/beads. In most cases, the glass composite material is used in the form of the glass paste. The glass paste is applied to the substrate through the screen printing method and the dispenser method, and fired after the drying process so as to execute sealing and adhesion. In such sealing and adhesion, the low-melting point glass composition in a softened fluidity state is in tight contact with the member to be sealed or adhered.

The PbO—$B_2O_3$ based low-melting point glass composition with large content of lead oxide has been widely utilized as the low-melting point glass composition. The PbO—$B_2O_3$ based low-melting point glass composition has a low softening point ranging from 350° C. to 400° C., and exhibits excellent softened fluidity at the temperature ranging from 400° C. to 450° C. as well as relatively high chemical stability. However, the recent tendency of promoting "Green Procurement and Green Design" has been demanding safer materials than ever before. In Europe, RoHS (Restriction of Hazardous Substances) Directive in the fields of electric/electronic devices has been executed, designating six substances including lead as prohibited substances. The new type of lead-free low-melting point glass composition has been under development.

Japanese Unexamined Patent Application Publication No. 2010-184852 discloses the low-melting point glass at the softening point of 380° C. or lower, which contains oxides of vanadium, phosphorus, tellurium, and iron. The low-melting point glass further contains any oxide of manganese, zinc, tungsten, molybdenum, and barium.

Japanese Unexamined Patent Application Publication No. 2012-96993 discloses the lead-free low-melting point glass composition that contains 25 to 50 mass % $V_2O_5$, 5 to 30 mass % BaO, 20 to 40 mass % $TeO_2$, 1 to 25 mass % $WO_3$, and 0 to 20 mass % $P_2O_5$ in terms of oxide of the component.

SUMMARY

The vacuum heat insulating multilayer glass panel applied to the window glass has been demanded to have highly reliable air-tight sealing part or adhesion part. Adhesiveness or tight contactness will be evaluated by judging whether or not leakage and exfoliation occur in the sealing part or the adhesion part in a Highly Accelerated Stress Test (HAST) of unsaturation type under the condition in which the temperature is set to 120° C., the humidity is set to 85%, and the pressure is set to 2 atm. Being adhered and bonded to the glass substrate such as soda-lime glass and borosilicate glass, the ceramic substrate such as aluminum oxide, aluminum nitride, and silicon nitride, and the silicon substrate, the glass composite material and the glass paste produced by using the lead-free low-melting point glass composition as disclosed in Japanese Unexamined Patent Application Publication Nos. 2010-184852 and 2012-96993 are likely to exfoliate from an adhesive interface in the HAST, failing to provide excellent adhesiveness and tight contactness.

The above-described material is required to be applied to the air-quench reinforced glass substrate or the chemically reinforced glass substrate. Therefore, lowering of the sealing temperature and the adhesion temperature has been strongly demanded. It is advantageous to perform adhesion and bonding at as low a temperature as possible, at least equal to or lower than 370° C.

It is an object of the present invention to provide the lead-free glass composition exhibiting excellent adhesiveness and tight contactness to the substrate at 370° C. or lower, and the glass composite material containing the lead-free glass composition, the glass paste, and the sealing structure body.

The lead-free glass composition according to the present invention contains vanadium oxide, tellurium oxide, alkali metal oxide, iron oxide, barium oxide, and tungsten oxide while containing substantially no phosphorus oxide, and further contains at least one of additional components including yttrium oxide, lanthanum oxide, cerium oxide, erbium oxide, ytterbium oxide, aluminum oxide, and gallium oxide. A content of the tellurium oxide is equal to or more than 25 mol %, and equal to or less than 43 mol % in terms of oxide $TeO_2$. A content of the alkali metal oxide is equal to or more than 4 mol %, and equal to or less than 27 mol % in terms of oxide $R_2O$ (R: alkali metal element).

The present invention provides the lead-free glass composition with excellent adhesiveness and tight contactness to the substrate, which allows adhesion and sealing at 370° C. or lower, the glass composite material containing the lead-free glass composition, the glass paste, and the sealing structure body.

DETAILED DESCRIPTION OF EMBODIMENTS

Figure 1:
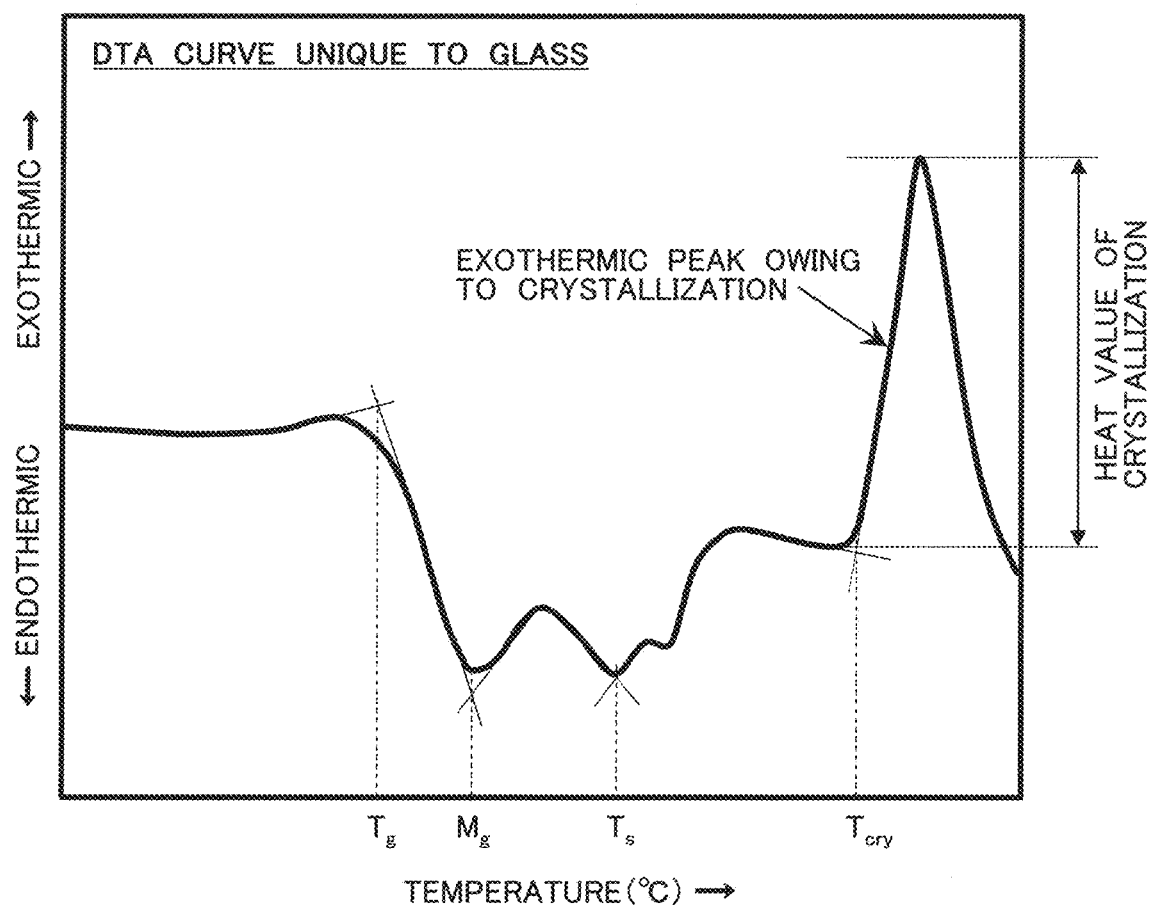
FIG. 1 shows an example of a representative difference thermal analysis (DTA) curve unique to the glass.

Embodiments of the present invention will be described in detail referring to the drawings. The present invention is not limited to the embodiments to be described hereinafter, but allows arbitrary combination or improvement so long as the spirit of the present invention is not changed.

(Lead-Free Low-Melting Point Glass Composition)

In general, the lower the characteristic temperature of the glass contained in the glass composition, for example, transition point, yield point, and softening point becomes, the better the softening fluidity at the low temperature becomes. Meanwhile, if the characteristic temperature is excessively lowered, the degree of crystalizing tendency becomes higher. This may easily cause crystallization in the heating/firing process. Crystallization may deteriorate the softening fluidity at a low temperature. In general, the glass with a lower characteristic temperature tends to exhibit deteriorated chemical stability such as humidity resistance, water resistance, acid resistance, alkali resistance, and salt water resistance, giving an increasing burden on the environment.

The inventors have made the present invention as a result of intensive studies on the lead-free low-melting point glass composition containing substantially no lead, exhibiting better softening fluidity at a low temperature than the generally employed PbO—$B_2O_3$ based low-melting point glass composition as well as excellent chemical stability, good adhesiveness and tight contactness to the substrate of arbitrary type (sealed member, adhered member and the like).

The lead-free low melting point glass composition contains vanadium oxide ($V_2O_5$), tellurium oxide ($TeO_2$), alkali metal oxide ($R_2O$, R denotes the alkali metal element), iron oxide ($Fe_2O_3$), barium oxide (BaO), and tungsten oxide ($WO_3$), and further contains at least one of additional components including yttrium oxide ($Y_2O_3$), lanthanum oxide ($La_2O_3$), cerium oxide ($CeO_2$), erbium oxide ($Er_2O_3$), ytterbium oxide ($Yb_2O_3$), aluminum oxide ($Al_2O_3$), and gallium oxide ($Ga_2O_3$) while containing substantially no phosphorus oxide. It is assumed that the "lead-free" herein represents the term allowed to contain the prohibited substance by the amount in the range equal to or smaller than the value prescribed in the above-described RoHS Directive (Effective date: Jul. 1, 2006). In the above-described case, lead (Pb) may be contained by the amount equal to or less than 1000 ppm. The phrase "substantially no phosphorus oxide is contained" denotes that no phosphorus oxide is intentionally added to the glass composition.

Next, functions of the main components of the above-described lead-free low-melting point glass composition, that is, $V_2O_5$, $TeO_2$, $R_2O$, $Fe_2O_3$, BaO, and $WO_3$ will be described. The glass structure composed of those main components includes a layered structure constituted by $V_2O_5$ and $TeO_2$. There are $R_2O$, $Fe_2O_3$, and BaO between the layers, and $WO_3$ exists in the layer. The components $R_2O$, $Fe_2O_3$, and BaO between the layers are thought to be combined with $V_2O_5$ constituting the layered structure. The component $TeO_2$ is a vitrifying component for vitrification in the glass producing process. Therefore, $TeO_2$ is indispensable component for forming the glass. In the case of small content of $TeO_2$, it is difficult to suppress the crystallization tendency. Meanwhile, in the case of large content of $TeO_2$, it is difficult to lower the characteristic temperature. Therefore, it is effective to set the content of $TeO_2$ to be equal to or more than 25 mol %, and equal to or less than 43 mol %. Preferably, the content of $V_2O_5$ is equal to or more than 30.5 mol %, and equal to or less than 45 mol %.

The component $R_2O$ that exists between layers of the layered structure constituted by $V_2O_5$ and $TeO_3$ serves to weaken the interlayer force and further lower the characteristic temperature such as the transition point, yield point, and softening point. As the content becomes larger, the temperature may be lowered more effectively. The component also serves to improve adhesiveness and tight contactness to various substrates. As the content becomes larger, the resultant effect may be greater. However, if the content becomes too large, the problem of deteriorating the chemical stability may occur. This may also make the thermal expansion coefficient too large to ensure consistency with each thermal expansion coefficient of the respective substrates (member to be sealed and adhered). Therefore, it is preferable to set the content of $R_2O$ to be equal to or more than 4 mol %, and equal to or less than 27 mol %, and more preferable to be equal to or more than 12 mol %, and equal to or less than 27 mol %. It is possible to use $Li_2O$, $Na_2O$, and $K_2O$ as the alkali metal oxide $R_2O$. If the content is small in the range from 4 mol % to 27 mol %, it is preferable to use $K^+$ ion ($K_2O$) with large ionic radius, and if the content is large in the above-described range, it is preferable to use $Li^+$ ion ($Li_2O$) with small ionic radius in consideration of the chemical stability, the characteristic temperature, and the thermal expansion coefficient.

The component $Fe_2O_3$ that exists between layers serves to improve the adhesiveness and tight contactness together with $R_2O$, and further improve the chemical stability. However, if the content is excessively large, the problem of raising the characteristic temperature may occur contrary to the case of $R_2O$. It is essential to set the relationship between $R_2O$ and $Fe_2O_3$ to $[R_2O]<6[Fe_2O_3]$ in view of the chemical stability. Like the above case, BaO that exists between layers serves to prevent and suppress adhesion failure owing to surface devitrification (crystallization) in heating of the glass. If the content is excessively large, however, the problem of deteriorating the adhesiveness and tight contactness to the respective substrates may occur. The component $WO_3$ that exists in the layer serves to improve the vitrification stability upon production of the glass. If the content is excessively large, however, the problem of raising the characteristic temperature may occur. Specifically, it is preferable to set the content of $Fe_2O_3$ to be equal to or more than 2.5 mol %, and equal to or less than 8 mol %. It is preferable to set the content of BaO to be equal to or more than 3 mol %, and equal to or less than 10 mol %, and the content of $WO_3$ to be equal to or more than 1 mol %, and equal to or less than 6 mol %.

In view of producing uniform glass, it is preferable to set relationships of contents (mol %) among the main components of the lead-free low-melting point glass composition in terms of the following oxides to $[V_2O_3]<2[R_2O]+6[Fe_2O_3]+2[BaO]<3.5[V_2O_5]$, $[WO_3]<[BaO]<[R_2O]+[Fe_2O_3]<[V_2O_5]<[TeO_2]+[R_2O]$, and $[R_2O]<6[Fe_2O_3]$ (R: alkali metal element), set the content of $TeO_2$ to be equal to or more than 25 mol %, and equal to or less than 43 mol %, and set the content of $R_2O$ to be equal to or more than 4 mol %, and equal to or less than 27 mol %.

The additional component serves to suppress the crystallization tendency, and contributes to improvement in the chemical stability. The inventors have found that presence of phosphorus oxide interferes with addition of those additional components as glass components to the glass structure. In general, it is well known that phosphorus oxide is the glass component which is likely to be vitrified with vanadium oxide. However, the lead-free low melting point glass composition according to the present invention is characterized in that no phosphorus oxide is contained in order to contain the above-described additional components.

In view of obtaining the homogeneous glass, it is preferable to form the relationship of contents among the additional components to $2[R_2O]+6[Fe_2O_3]+2[BaO]+6[Y_2O_3]+6[La_2O_3]+4[CeO_2]+6[Er_2O_3]+6[Yb_2O_3]+6[Al_2O_3]+6[Ga_2O_3]<3.5[V_2O_5]$ in terms of oxides $Y_2O_3$, $La_2O_3$, $CeO_2$, $Er_2O_3$, $Yb_2O_3$, $Al_2O_3$, and $Ga_2O_3$. It is preferable to set the content of the additional component to be equal to or more than 0.5 mol %, and equal to or less than 4.5 mol % in terms of oxides of the above-described components. Setting the content to 0.5 mol % or more ensures sufficient effects resulting from suppression of the crystallization tendency and improvement in the chemical stability. Setting the content to 4.5 mol % or less ensures suppression of the characteristic temperature rise. Among the above-described additional components, the use of $Y_2O_3$, $La_2O_3$, and $Al_2O_3$ is especially effective. It is preferable to set the content to be equal to or more than 1 mol %, and equal to or less than 3 mol %.

It is difficult for the known $V_2O_5$—$TeO_2$ based lead-free low-melting point glass composition to perform highly reliable sealing and adhesion at 370° C. or lower. Meanwhile, the glass with the above-described composition has been found to succeed in lowering of the characteristic temperature such as transition point, yield point, and softening point while improving the chemical stability. Furthermore, improvement in the adhesiveness and tight contactness to various substrates (member to be sealed and adhered) has also been observed. It has been found that setting of the above-described composition range allows the second endothermic peak temperature (hereinafter referred to as softening point) in the differential thermal analysis to be lowered to 350° C. or lower. It is therefore possible to provide the lead-free low-melting point glass composition which exhibits excellent softening fluidity at 370° C. or lower, in other words, which allows sealing and adhesion firmly to various substrates at the low temperature equal to or lower than 370° C.

The density of the glass is equal to or lower than 4.1 $g/cm^3$. In general, the glass with higher density is more likely to lower the characteristic temperature. On the contrary, the lead-free low-melting point glass composition according to the present invention shows that the lower density is more likely to lower the characteristic temperature. Preferably, the glass density is equal to or lower than 3.8 $g/cm^3$, and the softening point of the glass composition is equal to or lower than 330° C.

The characteristic temperature will be explained hereinafter. In the specification, the characteristic temperature is measured by the differential thermal analysis (DTA). The characteristic temperature is measured using glass particles with particle size of several tens μm, and the high purity alumina (α-$Al_2O_3$) particles as the reference sample at a temperature rise rate of 5° C./minute in the atmosphere. FIG. 1 shows an example of representative DTA curve unique to the glass. As shown in FIG. 1, the first endothermic peak starting temperature corresponds to a transition point $T_g$, the endothermic peak temperature corresponds to the yield point $M_g$, a second endothermic peak temperature corresponds to the softening point $T_s$, and the exothermic peak starting temperature owing to crystallization corresponds to a crystallization starting temperature $T_{cry}$. Generally, each of the characteristic temperatures is obtained through the tangential method. The characteristic temperatures of $T_g$, $M_g$ and $T_s$ are defined by the glass viscosity. Those temperatures $T_g$, $M_g$, and $T_s$ correspond to $10^{13.3}$ poise, $10^{11.0}$ poise, and $10^{7.65}$ poise, respectively. The crystallizing tendency is judged in accordance with the temperature $T_{cry}$ and size of the exothermic peak owing to crystallization. The glass exhibiting the increased value of $T_{cry}$, that is, the increased temperature difference between $T_s$ and $T_{cry}$, and the reduced crystallization heat value may be regarded as the glass unlikely to be crystallized.

The firing temperature at which various components are sealed and adhered using the generally employed low-melting point glass composition is influenced by firing conditions such as particles of ceramic contained in the composition, type, content, and particle size of bead, the temperature rise rate, atmosphere, pressure, and the like. In most cases, the firing temperature is set to a temperature 30° C. to 50° C. higher than the softening point $T_s$. At the above-described firing temperature, the low-melting point glass composition exhibits excellent softening fluidity without being crystallized. However, the characteristic temperatures of the lead-free low-melting point glass composition of an embodiment according to the present invention, that is, the transition point $T_g$, the yield point $M_g$, and the softening point $T_s$ are low, having a small temperature difference, that is, a large viscosity gradient, resulting in the excellent softening fluidity at the temperature 20° C. to 40° C. higher than the softening point $T_s$. In other words, since the softening point $T_s$ of the lead-free low-melting point glass composition of an embodiment according to the present invention is equal to or lower than 350° C., firing at 370° C. or lower may be carried out. This makes it possible to reduce the thermal damage to the sealing structure body (high functionality), improve productivity (tact reduction), and improve reliability of the sealed part and the adhered part while lessening the burden to the environment.

(Glass Composite Material and Glass Paste)

The glass composite material includes the low-melting point glass composition, ceramic particles, and glass beads.

The glass composite materials that contain the ceramic particles and the glass beads will be described. The glass bead is defined as the glass particle with average particle size of 50 μm or more.

Preferably, the glass composite material which contains ceramic particles and beads contains the lead-free low-melting point glass composition according to the present invention (equal to or more than 40 vol %, and less than 100 vol %), and ceramic (exceeding 0 vol %, and equal to or less than 60 vol %). Setting the content of the lead-free low-melting point glass composition to 40 vol. % or more, or the content of ceramic to 60 vol % or less allows the lead-free low-melting point glass composition to exhibit excellent softening fluidity, and allows highly reliable sealing and adhesion. For the ceramic, in view of suppression of crystallization, it is preferable to use at least any one of zirconium phosphate tungstate ($Zr_2(WO_4)PO_4)_2$), quartz glass ($SiO_2$), borosilicate glass ($SiO_2$—$B_2O_3$ base), soda-lime glass ($SiO_2$—$Na_2O$—$CaO$ base), β-eucryptite ($Li_2O.Al_2O_3.2SiO_2$), cordierite ($2MgO.2Al_2O_3.5SiO_2$), zirconium silicate ($ZrSiO_4$), alumina ($Al_2O_3$), mullite ($3Al_2O_3.2SiO_2$), and niobium oxide ($Nb_2O_3$). The zirconium phosphate tungstate ($Zr_2(WO_4)(PO_4)_2$), or the quartz glass ($SiO_2$) may be the ceramic effective for expanding the glass composite material at a low temperature while having its preferable content equal to or more than 30 vol %, and equal to or less than 60 vol %.

It is possible to use glass beads such as the soda-lime glass ($SiO_2$—$Na_2O$—$CaO$ based glass), borosilicate glass ($SiO_2$—$B_2O_3$—$Na_2O$ based glass), and quartz glass ($SiO_2$).

The glass paste includes the glass composite material that contains the lead-free low-melting point glass composition, the binder, and the solvent. It is preferable to use polypropylene carbonate for the binder, and to use dihydroterpineol for the solvent. The above-described combination of the binder and the solvent hardly allows crystallization of the lead-free low-melting point glass composition of an embodiment according to the present invention. This further allows reduction in residual bubbles in the process of heating and firing. It is possible to add the viscosity modifier and the lubricant as needed so as to ensure adjustment of stability and application property of the glass paste.

(Sealing Structure Body)

The glass composite material and the glass paste are suitably used for sealing and adhesion of the vacuum heat insulating multilayer glass applied to window glass or the like, the display panel such as plasma display panel, organic EL display panel, fluorescent display tube, and a package device such as crystal resonator, IC package, and MEMS. The sealing structure body of an embodiment according to the present invention is made of the above-described glass composite material, and includes an inner space, and a sealing part which isolates at least a part of the boundary between the inner space and the outside. Preferably, the content of the lead-free low-melting point glass composition in the glass composite material for forming the sealing part is equal to or more than 40 vol %.

The present invention will be described in detail based on the specific embodiments. The present invention is not limited to those described herein, but may be arbitrarily varied.

First Embodiment

In a first embodiment, the glass composition shown in Tables 1 and 2 to be described later is produced so as to evaluate the influence of the glass composition to characteristics of the glass.

(Production of Lead-Free Low-Melting Point Glass Composition)

Lead-free low-melting point glass compositions A-01 to A-38 (embodiment) shown in Table 1, and lead-free low-melting point glass compositions B-01 to B-18 and B-20 to B-28 (comparative example) are produced, which will be described later. Each composition shown in Tables 1 and 2 represents a glass production formulation. Powdered $V_2O_3$ and $TeO_2$>99% purity (manufactured by Shinko Chemical Co., Ltd.), and powdered $Li_2CO_3$, $Na_2CO_3$, $K_2CO_3$, $Fe_2O_3$, $BaCO_3$, $WO_3$, $Y_2O_3$, $La_2O_3$, $CeO_2$, $Er_2O_3$, $Yb_2O_3$, $Al_2O_3$, $Ga_2O_3$, $P_2O_5$, and ZnO (manufactured by KOJUNDO CHEMICAL LABORABORY CO., LTD.) are used as the starting material for glass production.

The respective powdered starting materials are weighed, combined, and mixed so that the mixture weighs approximately 200 g in total. The mixture is then put into a platinum crucible. The platinum crucible containing the powdered mixture material is placed inside the glass melting furnace, and heated from 750° C. to 950° C. at the temperature rise ratio of approximate 10° C./minute. It is held for one hour while having the molten liquid in the crucible agitated with an alumina bar so as to make the composition uniform. The lead-free low-melting point glass compositions A-01 to A-07 according to the embodiment are fused at 850° C., A-08 to A-28 are fused at 800° C., and A-29 to A-38 are fused at 750° C. As for the comparative examples, the lead-free low-melting point glass compositions B-01 to B-06 are fused at 950° C., B-07 to B-18 and B-20 to B-27 are fused at 900° C., and B-28 is fused at 750° C., respectively. Thereafter, the platinum crucible is taken out from the glass furnace, and the molten liquid is poured into a stainless mold preliminarily heated at around 150° C. to produce the lead-free low-melting point glass compositions A-01 to A-38, and the lead-free low-melting point glass compositions B-01 to B-18, B-20 to B27 as comparative examples.

(Measurement of Density)

The thus produced lead-free low-melting point glass composition is roughly milled with the stamp mill, and further milled until its powder size becomes under 45 μm using Raikai mixer. Each density of the resultant powdered glass is measured by pycnometry in helium gas.

(Measurement of Characteristic Temperatures)

The same powdered glass as the one used for the density measurement is subjected to the differential thermal analysis (DTA) at the temperature rise rate of 5° C./minute in the atmosphere. The DTA curve as shown in FIG. 1 is obtained. The DTA of macro-cell type is employed. The respective data of the transition point $T_g$, yield point $M_g$, and softening point $T_s$ are measured in reference to the obtained DTA curve.

(Measurement of Thermal Expansion Coefficient)

Figure 2:
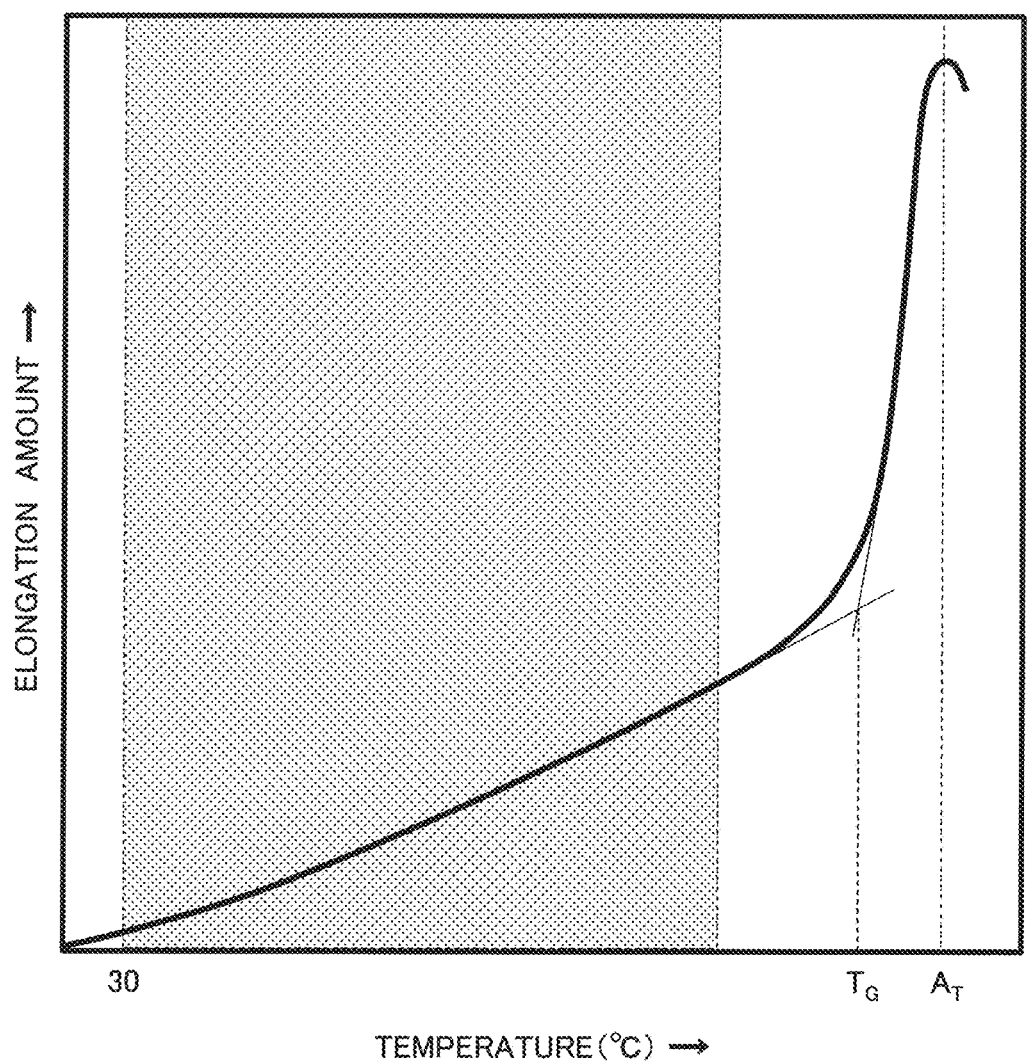
FIG. 2 shows an example of a representative thermal expansion curve of a lead-free low-melting point glass composition.

The produced lead-free low-melting point glass compositions are heated in the temperature ranges from the transition point $T_g$ to the yield point $M_g$ in the DTA, and then gradually cooled to remove the residual thermal strain. The composition is processed into a 4×4×20 mm prism. Each thermal expansion of the obtained glasses is measured by the thermal expansion meter at the temperature rise rate of 5° C./minute in the atmosphere. A columnar quartz glass of φ5×20 mm is used as a reference sample. FIG. 2 shows a thermal expansion curve of the representative lead-free low-melting point glass composition. In FIG. 2, an elongation amount of the quartz glass as the reference sample is subtracted. The lead-free low-melting point glass composition elongates as it is heated. It starts elongating markedly at a transition temperature $T_G$ which substantially coincides with the transition point $T_g$ derived from the DTA. As it is further heated to reach a deformation temperature $A_T$, the lead-free low-melting point glass composition is thermally deformed to be seemingly contracted. In general, the thermal expansion coefficient of the glass is measured from the gradient in the temperature range from the room temperature to the temperature lower than the $T_G$. The respective thermal expansion coefficients of the lead-free low-melting point glass compositions A-01 to A-38 according to the embodiment are calculated from the gradient in the temperature range from 30° C. to 200° C. The respective thermal expansion coefficients of the lead-free low-melting point glass compositions as the comparative examples are calculated from the gradient in the respective temperature ranges. That is, those of B-01 to B-06 are calculated from the gradient in the temperature range from 30° C. to 300° C., those of B-07 to B-09 are calculated from the gradient in the temperature range from 30° C. to 250° C., and those of B-10 to B-18, and B-20 to B-28 are calculated from the gradient in the temperature range from 30° C. to 200° C.

(Production and Evaluation of Sealing Structure Body)

Figure 3A:
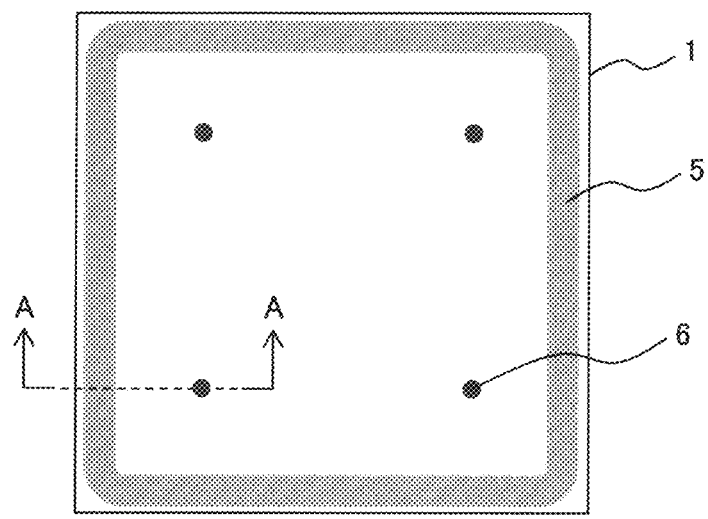
FIG. 3A is a schematic top view of a sealing structure body according to a first embodiment.
Figure 3B:
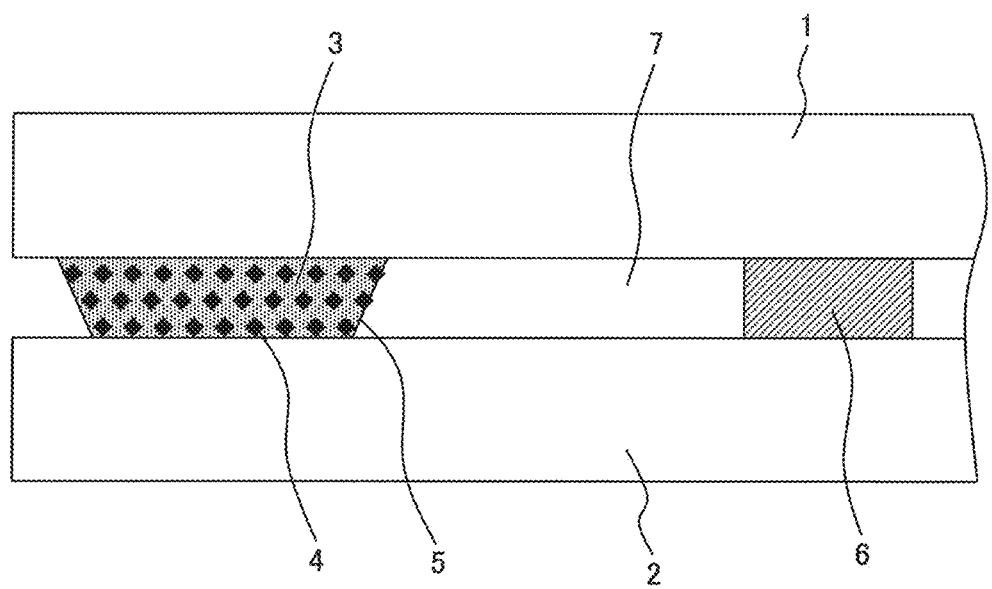
FIG. 3B is a sectional view taken along line A-A of FIG. 3A.

The sealing structure body as shown in FIGS. 3A and 3B is produced using the glass composite material containing the lead-free low-melting point glass composition shown in Tables 1 and 2, and the low thermal expansion ceramic particles, and subjected to the HAST for 48 hours under the condition at the temperature of 120° C., humidity of 85%, and pressure of 2 atm. Using a glass composite material 5 containing a lead-free low-melting point glass composition 3 and low thermal expansion ceramic particles 4, the sealing structure body as shown in FIGS. 3A and 3B is produced by sealing peripheral outlines of glass substrates 1, 2 each 50 mm×50 mm, and 3 mm in thickness at the temperature 20° C. to 30° C. higher than the temperature $T_S$ of the lead-free low-melting point glass composition 3. A spacer 6 is interposed between those two glass substrates 1 and 2 so as to form an inner space 7. The soda-lime glass ($SiO_2$—$Na_2O$—CaO based glass) with the thermal expansion coefficient of $88\times10^{-7}$/° C. is used for forming the glass substrates 1, 2.

Figure 4:
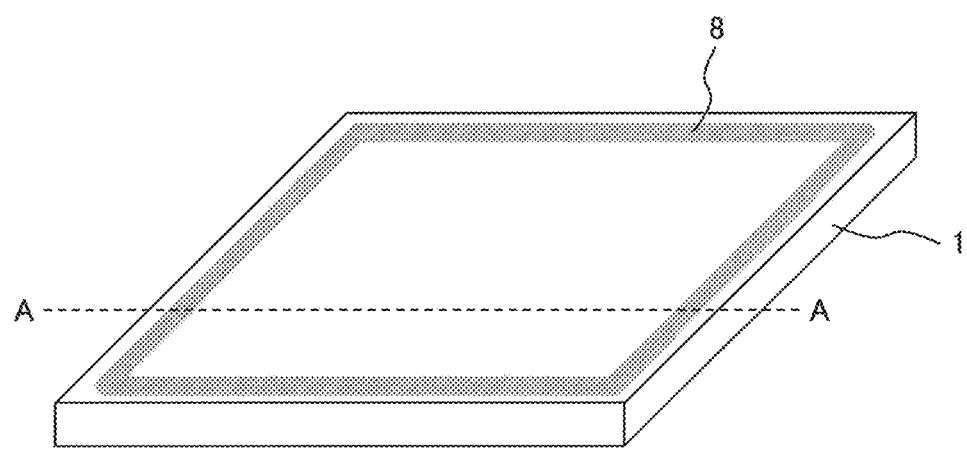
FIG. 4 is a view showing the process of producing the sealing structure body according to a first embodiment.
Figure 4:
Figure 4:
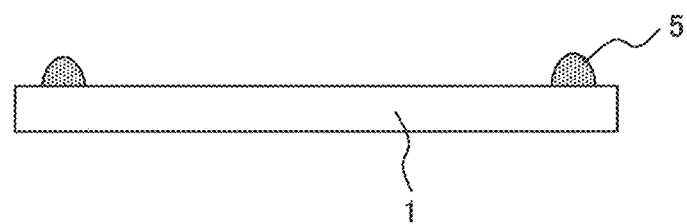
Figure 5:
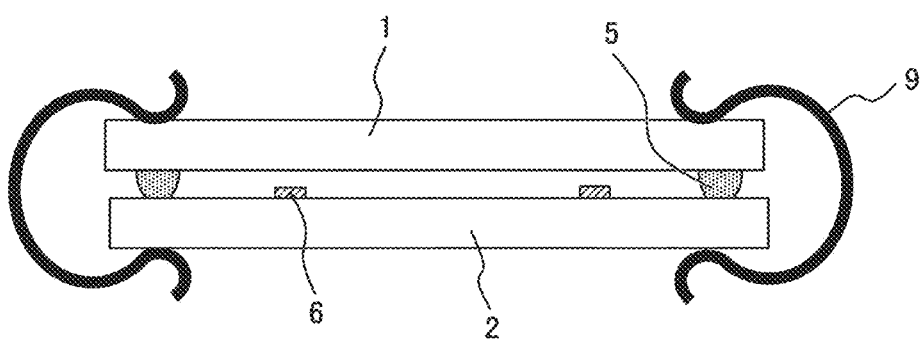
FIG. 5 is a view showing the process of producing the sealing structure body according to the first embodiment.
Figure 5:
Figure 5:
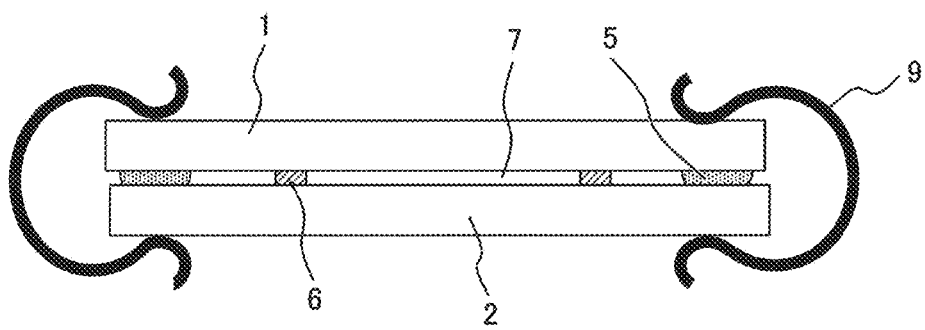

FIGS. 4 and 5 show the process of producing the sealing structure body as shown in FIGS. 3A and 3B. A glass composite material paste 8 containing particles of the lead-free low-melting point glass composition 3 shown in Table 1 or 2, the low thermal expansion ceramic particle 4, the binder, and the solvent is produced. Powdered glass with its size under 45 μm for measurement of the density and the characteristic temperature is used for the particles of the lead-free low-melting point glass composition 3. As the low thermal expansion ceramic particle 4, zirconium phosphate tungstate ($Zr_2(WO_4)PO_4)_2$) with average particle size of approximately 15 μm is used. The density and the thermal expansion coefficient of the ceramic are 3.8 g/cm$^3$, and $-32\times10^{-7}$/° C., respectively. The content ratio between the lead-free low-melting point glass composition 3 and the low thermal expansion ceramic particle 4 is set by adjusting the thermal expansion coefficient to approximately $80\times10^{-7}$/° C. The adjustment is made to suppress application of tensile strength to the glass composite material 5 of the sealing part as least as possible in consideration of the thermal expansion coefficient of the glass substrates 1, 2 to be used, that is, the soda-lime glass. In order to minimize the residual bubbles in the glass composite material 5 of the sealing part, polypropylene carbonate is used for the binder, and dihydroterpineol is used for the solvent. After examination on various binders and solvents, it is found that the above-described combination for minimizing the residual bubbles is the most suitable for the lead-free low-melting point glass composition according to the present invention, and the glass composite material containing the lead-free low-melting point glass composition. The glass composite material paste 8 is produced while having the solid content including particles of the lead-free low-melting point glass composition 3 and the low thermal expansion ceramic particle 4 set in the range from 80 to 85 mass %.

As shown in FIG. 4, the produced glass composite material paste 8 is applied to a peripheral outline of the glass substrate 1 through a dispenser method, and dried at 150° C. It is then heated in the temperature range from the transition point $T_g$ to the yield point $M_g$ of the low-melting point glass composition 3 to be used at a temperature rise rate of 5° C./minute in the atmosphere. It is held for 30 minutes, and heated at the similar temperature rise rate up to the temperature 20° C. to 30° C. higher than the softening point $T_S$. It is held for 30 minutes for firing to form the glass composite material 5 along the peripheral outline of the glass substrate 1. As shown in FIG. 5, four columnar spacers 6 each φ500 μm×200 μm are disposed on the other glass substrate 2 so as to be positioned to face the glass substrate 1 applied with the glass composite material 5. Four heat resistance clips 9 are attached to four sides of the respective glass substrates 1, 2 so as to be heated at the temperature 20° C. to 30° C. higher than the softening point $T_S$ of the low-melting point glass composition 3 to be used at the temperature rise rate of 5° C./minute in the atmosphere. It is held for 30 minutes, and then sealed to produce the sealing structure body as shown in FIGS. 3A and 3B. The inner space 7 of the produced sealing structure body is slightly in the depressurized state resulting from compressed air.

The produced sealing structure body is subjected to the HAST (temperature: 120° C., humidity: 85%, pressure: 2 atm) for 48 hours for evaluating reliability of the sealing part. If exfoliation is observed in an arbitrary portion of the sealing part, leading to leakage, the sealing structure body is rated unacceptable "x". If no exfoliation is observed to have substantially no leakage, the sealing structure body is rated acceptable "◯". If leakage occurs, water will infiltrate to the inside of the sealing structure body. Therefore, the judgement may be easily made. The evaluation is made comprehensively in consideration of lowering the sealing temperature. The comprehensive evaluation is performed as follows. If it is judged that the highly reliable sealing is obtained at the low temperature equal to or lower than 370° C., the product is accepted and rated as good "◯". Especially, if it is judged that the highly reliable sealing is obtainable at the low temperature equal to or lower than 350° C., the product will be accepted and rated as excellent "⊚". Meanwhile, if the sealing temperature exceeds 370° C., or the sealing fails to exhibit high reliability, the product will be rated unacceptable "x". Reinforced glass substrate intended to be used as the sealed member or the adhered member has to be sealed or adhered at the temperature at least lower than 370° C. In the above-described case, the softening point $T_S$ of the lead-free low-melting point glass composition to be used has to be set to the temperature at least equal to or lower than 350° C.

As the temperature margin has to be sufficiently considered for actual mass production, the product that can be sealed or adhered at 350° C. or lower is advantageous. Consequently, it is preferable to set the softening point $T_S$ of the lead-free low-melting point glass composition to be used to the temperature at least lower than 330° C.

Tables 1 and 2 show data of glass composition, density, characteristic temperature, and thermal expansion coefficient of the lead-free low-melting point glass compositions A-01 to A-38 according to the embodiment, and the lead-free low-melting point glass compositions B-01 to B-18, and B-20 to B-28 as comparative examples, respectively. Table 3 shows data of sealing conditions and evaluation results of the sealing structure bodies produced using the glass composite materials containing the lead-free low-melting point glass compositions according to the embodiment as shown in Table 1, and ceramic particles. Table 4 shows data of sealing conditions and evaluation results of the sealing structure bodies produced using the glass composite materials containing the low-melting point glass compositions as the comparative examples as shown in Table 2, and the ceramic particles.

TABLE 1

Compositions and properties of lead-free glass (Embodiment)

| Embodiment No. | Glass composition (mol %) | | | | | | | | | | | | | | | Density (g/cm³) | Characteristic Temperature (°C) | | | Thermal expansion coefficient (×10⁻⁷/°C) | Temperature range |
|---|---|---|---|---|---|---|---|---|---|---|---|---|---|---|---|---|---|---|---|---|---|
| | V₂O₅ | TeO₂ | Li₂O | Na₂O | K₂O | Fe₂O₃ | BaO | WO₃ | Y₂O₃ | La₂O₃ | CeO₂ | Er₂O₃ | Yb₂O₃ | Al₂O₃ | Ga₂O₃ | | Transition point T_g | Yield point M_g | Softening point T_s | | |
| A-01 | 38.0 | 40.0 | — | — | 4.0 | 7.5 | 4.5 | 3.5 | 0.5 | 0.5 | — | — | — | 0.5 | — | 4.06 | 288 | 309 | 348 | 123 | 30-200 |
| A-02 | 38.0 | 43.0 | — | — | 5.0 | 8.0 | 3.0 | 1.0 | 0.5 | 0.5 | — | — | — | — | 0.5 | 4.10 | 286 | 312 | 366 | 130 | |
| A-03 | 45.0 | 40.0 | — | — | 5.0 | 5.0 | 3.0 | 1.0 | — | 0.5 | — | — | — | 0.5 | — | 4.02 | 282 | 306 | 345 | 123 | |
| A-04 | 40.0 | 38.5 | — | — | 5.0 | 3.5 | 8.0 | 4.0 | — | 0.5 | — | — | — | 0.5 | — | 4.03 | 271 | 292 | 332 | 140 | |
| A-05 | 37.0 | 42.0 | — | — | 5.0 | 5.0 | 5.5 | 3.5 | — | 0.7 | — | — | — | 0.8 | — | 4.08 | 281 | 303 | 344 | 136 | |
| A-06 | 35.0 | 42.0 | — | — | 5.5 | 7.0 | 4.5 | 3.5 | — | 0.5 | 0.5 | — | — | 1.0 | — | 4.09 | 291 | 313 | 350 | 133 | |
| A-07 | 42.0 | 35.0 | — | — | 7.0 | 4.0 | 5.5 | 3.5 | 0.5 | — | — | 0.5 | — | 0.5 | — | 3.95 | 268 | 287 | 327 | 143 | |
| A-08 | 38.0 | 37.0 | — | — | 9.0 | 5.0 | 5.5 | 3.5 | — | 1.0 | — | 0.5 | 0.5 | 1.0 | — | 3.95 | 271 | 293 | 332 | 146 | |
| A-09 | 36.0 | 38.0 | — | — | 9.0 | 7.5 | 4.5 | 3.5 | — | — | — | 0.5 | — | — | 0.5 | 3.96 | 281 | 304 | 344 | 141 | |
| A-10 | 40.0 | 35.0 | 10.0 | — | — | 5.0 | 5.0 | 4.0 | — | 0.5 | — | — | — | 0.5 | — | 4.04 | 278 | 296 | 335 | 128 | |
| A-11 | 40.0 | 35.0 | 14.5 | — | — | 5.0 | 5.0 | 4.0 | — | 0.5 | — | — | — | 0.5 | — | 4.98 | 275 | 295 | 333 | 131 | |
| A-12 | 40.0 | 35.0 | — | 10.0 | — | 5.0 | 5.0 | 4.0 | — | 0.5 | — | — | — | 0.5 | — | 4.98 | 271 | 290 | 330 | 137 | |
| A-13 | 38.0 | 38.0 | — | — | 10.5 | 5.0 | 5.5 | 3.5 | — | 0.7 | — | — | — | 0.8 | — | 3.89 | 273 | 290 | 333 | 143 | |
| A-14 | 38.0 | 37.0 | — | — | 12.0 | 5.0 | 5.0 | 3.5 | — | 0.5 | — | — | — | 0.5 | — | 3.94 | 266 | 295 | 333 | 155 | |
| A-15 | 35.0 | 35.5 | — | — | 13.5 | 5.0 | 5.5 | 3.5 | — | 0.7 | 0.5 | — | — | 0.8 | — | 3.90 | 268 | 290 | 326 | 168 | |
| A-16 | 36.0 | 35.0 | — | — | 13.5 | 7.0 | 4.0 | 3.5 | 0.5 | — | — | — | — | 0.5 | — | 3.85 | 275 | 300 | 339 | 161 | |
| A-17 | 40.0 | 33.0 | — | — | 14.0 | 3.0 | 5.0 | 3.5 | — | 0.7 | — | — | — | 0.8 | — | 3.87 | 251 | 273 | 310 | 168 | |
| A-18 | 40.0 | 31.0 | — | — | 14.0 | 5.0 | 5.0 | 3.5 | — | 0.7 | — | — | — | 0.8 | — | 3.77 | 261 | 283 | 321 | 162 | |
| A-19 | 34.0 | 30.0 | — | — | 14.0 | 2.5 | 10.0 | 6.0 | 1.0 | 1.0 | — | — | — | 0.5 | — | 3.75 | 280 | 305 | 342 | 142 | |
| A-20 | 32.0 | 37.0 | — | — | 15.0 | 8.0 | 4.0 | 3.5 | — | 2.0 | — | — | 0.5 | 0.5 | — | 4.06 | 285 | 306 | 347 | 170 | |
| A-21 | 37.0 | 31.5 | — | — | 15.0 | 4.0 | 5.0 | 3.0 | 0.5 | 0.5 | 0.5 | — | — | 1.0 | — | 3.81 | 283 | 298 | 341 | 166 | |
| A-22 | 35.0 | 33.0 | — | — | 17.0 | 5.0 | 5.0 | 3.5 | — | 1.0 | — | — | — | 0.5 | — | 3.87 | 264 | 288 | 325 | 177 | |
| A-23 | 38.0 | 30.0 | — | — | 17.0 | 3.0 | 5.0 | 3.5 | — | 1.0 | — | — | — | 0.5 | — | 3.76 | 248 | 288 | 305 | 177 | |
| A-24 | 38.0 | 30.0 | — | — | 17.0 | 5.0 | 5.0 | 3.0 | — | 0.5 | — | — | — | 1.0 | — | 3.68 | 248 | 289 | 321 | 176 | |
| A-25 | 37.0 | 30.0 | — | — | 17.0 | 5.0 | 5.0 | 3.0 | — | 1.0 | — | — | — | 1.0 | — | 3.70 | 261 | 284 | 325 | 175 | |
| A-26 | 38.0 | 30.0 | 17.5 | — | — | 5.0 | 5.0 | 3.0 | — | 1.0 | — | — | — | 0.5 | — | 4.01 | 240 | 264 | 303 | 160 | |
| A-27 | 38.0 | 30.0 | — | 17.5 | — | 5.0 | 5.0 | 3.0 | — | 1.0 | — | — | — | 0.5 | — | 3.83 | 248 | 271 | 310 | 165 | |
| A-28 | 38.0 | 30.0 | — | — | 17.5 | 5.0 | 5.0 | 3.0 | — | 1.0 | — | — | — | 0.5 | — | 3.63 | 255 | 280 | 317 | 175 | |
| A-29 | 39.0 | 28.0 | 20.0 | — | — | 3.5 | 4.5 | 3.5 | — | 0.5 | — | — | — | 1.0 | — | 3.90 | 224 | 245 | 281 | 174 | |
| A-30 | 39.0 | 28.0 | — | 20.0 | — | 3.5 | 4.5 | 3.5 | — | 0.5 | — | — | — | 1.0 | — | 3.76 | 233 | 252 | 288 | 188 | |
| A-31 | 38.0 | 28.0 | — | — | 20.0 | 4.0 | 4.5 | 3.5 | — | 0.5 | — | — | — | 1.0 | — | 3.60 | 244 | 264 | 303 | 194 | |
| A-32 | 37.0 | 26.5 | 23.0 | — | — | 4.0 | 4.5 | 3.5 | — | 0.5 | — | — | — | 1.0 | — | 3.85 | 230 | 250 | 290 | 171 | |
| A-33 | 37.0 | 26.5 | — | 23.0 | — | 4.0 | 4.5 | 3.5 | — | 0.5 | — | — | — | 1.0 | — | 3.68 | 232 | 253 | 295 | 191 | |
| A-34 | 37.0 | 26.5 | — | — | 23.0 | 4.0 | 4.5 | 3.5 | — | 0.5 | — | — | — | 1.0 | — | 3.53 | 249 | 271 | 311 | 189 | |
| A-35 | 34.0 | 26.0 | 25.0 | — | — | 4.5 | 5.0 | 4.0 | — | 0.5 | — | — | — | 0.5 | — | 3.80 | 251 | 270 | 314 | 165 | |
| A-36 | 34.0 | 26.0 | — | — | 25.0 | 5.0 | 5.0 | 4.0 | — | 1.0 | — | — | — | 0.5 | — | 3.44 | 255 | 281 | 319 | 177 | |
| A-37 | 30.5 | 25.0 | — | — | 26.0 | 4.5 | 8.5 | 5.5 | 0.5 | 0.5 | — | — | — | 1.0 | — | 3.38 | 261 | 289 | 328 | 196 | |
| A-38 | 32.0 | 25.0 | 27.0 | — | — | 5.0 | 5.0 | 4.0 | 0.5 | 0.5 | — | — | — | 1.0 | — | 3.75 | 271 | 290 | 325 | 178 | |

TABLE 2

Compositions and properties of lead-free glass (Comparative example)

| Comparative example No. | Glass composition (mol %) | | | | | | | | | Density (g/cm³) | Characteristic Temperature (° C.) | | | Thermal expansion coefficient | |
|---|---|---|---|---|---|---|---|---|---|---|---|---|---|---|---|
| | $P_2O_5$ | $V_2O_2$ | $TeO_2$ | $K_2O$ | $Fe_2O_3$ | BaO | $WO_3$ | $La_2O_3$ | ZnO | | Transition point $T_g$ | Yield point $M_g$ | Softening point $T_s$ | ($\times 10^{-7}$/° C.) | Temperature range (° C.) |
| B-01 | 20.1 | 41.7 | — | — | — | 30.9 | 7.3 | — | — | 3.85 | 362 | 384 | 433 | 109 | 30-300 |
| B-02 | 23.1 | 46.7 | — | — | — | 22.9 | 7.3 | — | — | 3.63 | 350 | 378 | 427 | 98 | |
| B-03 | 23.2 | 37.5 | 5.3 | — | — | 23.0 | 11.0 | — | — | 3.85 | 376 | 403 | 457 | 102 | |
| B-04 | 20.1 | 41.8 | 5.3 | — | — | 25.5 | 7.3 | — | — | 3.81 | 352 | 370 | 426 | 111 | |
| B-05 | 22.3 | 36.1 | — | 8.8 | — | 22.2 | 10.6 | — | — | 3.69 | 257 | 381 | 430 | 129 | |
| B-06 | 20.5 | 36.0 | 5.2 | — | — | 31.2 | 7.1 | — | — | 3.82 | 356 | 384 | 430 | 131 | |
| B-07 | — | 33.1 | 24.2 | — | — | 15.1 | 6.7 | — | 20.9 | 4.38 | 300 | 314 | 366 | 126 | 30-250 |
| B-08 | 15.2 | 43.0 | 31.3 | — | 10.5 | — | — | — | — | 3.58 | 298 | 320 | 360 | 98 | |
| B-09 | 11.7 | 41.3 | 31.3 | — | 15.7 | — | — | — | — | 3.65 | 312 | 340 | 381 | 93 | |
| B-10 | 11.8 | 43.5 | 31.6 | — | — | 7.4 | — | 3.6 | 2.1 | 3.69 | 281 | 308 | 355 | 95 | 30-200 |
| B-11 | 10.6 | 42.1 | 29.2 | — | — | 6.3 | 5.7 | — | 6.1 | 3.76 | 282 | 309 | 359 | 95 | |
| B-12 | 6.0 | 42.5 | 41.9 | — | — | 7.4 | 2.2 | — | — | 3.89 | 276 | 300 | 339 | 109 | |
| B-13 | 5.9 | 41.8 | 39.2 | — | — | 7.4 | — | 3.6 | 2.1 | 3.89 | 280 | 303 | 342 | 107 | |
| B-14 | 5.9 | 39.8 | 41.2 | — | — | 7.4 | — | 3.6 | 2.1 | 3.94 | 282 | 307 | 346 | 109 | |
| B-15 | 5.9 | 38.8 | 42.2 | — | — | 7.4 | — | 3.6 | 2.1 | 3.97 | 281 | 307 | 347 | 108 | |
| B-16 | 6.7 | 34.4 | 31.0 | 8.8 | — | 12.0 | 7.1 | — | — | 4.05 | 276 | 293 | 336 | 157 | |
| B-17 | 5.8 | 37.7 | 32.2 | — | — | 17.0 | 7.3 | — | — | 4.23 | 292 | 312 | 354 | 125 | |
| B-18 | 3.6 | 37.6 | 34.4 | — | — | 16.8 | 7.4 | — | — | 4.30 | 289 | 309 | 345 | 130 | |
| B-20 | — | 37.8 | 32.3 | — | — | 22.5 | 7.4 | — | — | 4.39 | 284 | 303 | 334 | 143 | |
| B-21 | — | 37.9 | 37.8 | — | — | 16.9 | 7.4 | — | — | 4.43 | 276 | 298 | 331 | 137 | |
| B-22 | — | 37.6 | 34.2 | 3.6 | — | 16.7 | 7.4 | 0.5 | — | 4.11 | 271 | 295 | 328 | 140 | |
| B-23 | — | 38.1 | 36.9 | — | — | 17.0 | 7.5 | 0.5 | — | 4.42 | 279 | 302 | 353 | 135 | |
| B-24 | — | 37.4 | 36.2 | — | — | 14.4 | 7.3 | 0.5 | 4.2 | 4.40 | 277 | 299 | 333 | 132 | |
| B-25 | — | 37.6 | 36.4 | 1.8 | — | 17.8 | 5.9 | 0.5 | — | 4.36 | 275 | 300 | 332 | 142 | |
| B-26 | — | 34.9 | 40.9 | — | — | 16.8 | 7.4 | — | — | 4.49 | 279 | 303 | 338 | 142 | |
| B-27 | — | 37.8 | 36.6 | — | — | 19.2 | 5.9 | 0.5 | — | 4.40 | 277 | 304 | 336 | 136 | |
| B-28 | — | 30.0 | 25.0 | 30.0 | 3.0 | 6.6 | 5.0 | 1.0 | — | 3.32 | 251 | 271 | 317 | 205 | |

TABLE 3

Evaluation result of sealing structure body (Embodiment)

| Embodiment No. | Glass composite material (vol %) | | Sealing temperature (° C.) | HAST (48 hours) Temperature: 120° C. - Humidity: 85% - Pressure: 2 atm | Total Evaluation |
|---|---|---|---|---|---|
| | Glass content | Ceramic content | | | |
| A-01 | 72 | 28 | 370 | ○ | ○ |
| A-02 | 69 | 31 | 370 | ○ | ○ |
| A-03 | 72 | 28 | 370 | ○ | ○ |
| A-04 | 65 | 35 | 360 | ○ | ○ |
| A-05 | 67 | 33 | 370 | ○ | ○ |
| A-06 | 68 | 32 | 370 | ○ | ○ |
| A-07 | 64 | 36 | 350 | ○ | ◎ |
| A-08 | 63 | 37 | 360 | ○ | ○ |
| A-09 | 65 | 35 | 370 | ○ | ○ |
| A-10 | 70 | 30 | 360 | ○ | ○ |
| A-11 | 69 | 31 | 360 | ○ | ○ |
| A-12 | 66 | 34 | 350 | ○ | ◎ |
| A-13 | 64 | 36 | 360 | ○ | ○ |
| A-14 | 60 | 40 | 350 | ○ | ◎ |
| A-15 | 56 | 44 | 350 | ○ | ◎ |
| A-16 | 58 | 42 | 360 | ○ | ○ |
| A-17 | 56 | 44 | 330 | ○ | ◎ |
| A-18 | 58 | 45 | 350 | ○ | ◎ |
| A-19 | 64 | 36 | 370 | ○ | ○ |
| A-20 | 55 | 45 | 370 | ○ | ○ |
| A-21 | 57 | 43 | 370 | ○ | ○ |
| A-22 | 54 | 46 | 350 | ○ | ◎ |
| A-23 | 54 | 46 | 330 | ○ | ◎ |
| A-24 | 54 | 46 | 350 | ○ | ◎ |
| A-25 | 54 | 46 | 350 | ○ | ◎ |
| A-26 | 58 | 42 | 330 | ○ | ◎ |
| A-27 | 57 | 43 | 330 | ○ | ◎ |

TABLE 3-continued

Evaluation result of sealing structure body (Embodiment)

| Embodiment No. | Glass composite material (vol %) Glass content | Ceramic content | Sealing temperature (° C.) | HAST (48 hours) Temperature: 120° C. - Humidity: 85% - Pressure: 2 atm | Total Evaluation |
|---|---|---|---|---|---|
| A-28 | 54 | 46 | 340 | ○ | ◎ |
| A-29 | 54 | 46 | 310 | ○ | ◎ |
| A-30 | 51 | 49 | 310 | ○ | ◎ |
| A-31 | 50 | 50 | 330 | ○ | ◎ |
| A-32 | 55 | 45 | 310 | ○ | ◎ |
| A-33 | 50 | 30 | 320 | ○ | ◎ |
| A-34 | 48 | 52 | 330 | ○ | ◎ |
| A-35 | 54 | 46 | 340 | ○ | ◎ |
| A-36 | 49 | 51 | 340 | ○ | ◎ |
| A-37 | 50 | 50 | 350 | ○ | ◎ |
| A-38 | 53 | 47 | 350 | ○ | ◎ |

TABLE 4

Evaluation result of sealing structure body (Comparative example)

| Comparative No. | Glass composite material (vol %) Glass content | Ceramic content | Sealing temperaure (° C.) | HAST (48 hours) Temperature: 120° C. - Humidity: 85% - Pessure: 2 atm | Total evaluation |
|---|---|---|---|---|---|
| B-01 | 79 | 21 | 460 | X | X |
| B-02 | 86 | 14 | 450 | X | X |
| B-03 | 84 | 16 | 480 | X | X |
| B-04 | 78 | 22 | 450 | X | X |
| B-05 | 70 | 30 | 460 | ○ | X |
| B-06 | 69 | 31 | 460 | ○ | X |
| B-07 | 71 | 29 | 390 | X | X |
| B-08 | 86 | 14 | 390 | ○ | X |
| B-09 | 90 | 10 | 410 | ○ | X |
| B-10 | 88 | 12 | 380 | ○ | X |
| B-11 | 88 | 12 | 380 | ○ | X |
| B-12 | 79 | 21 | 360 | X | X |
| B-13 | 81 | 19 | 370 | X | X |
| B-14 | 79 | 21 | 370 | X | X |
| B-15 | 80 | 20 | 370 | X | X |
| B-16 | 59 | 41 | 360 | X | X |
| B-17 | 71 | 29 | 360 | X | X |
| B-18 | 69 | 31 | 370 | X | X |
| B-20 | 64 | 36 | 360 | X | X |
| B-21 | 66 | 34 | 360 | X | X |
| B-22 | 65 | 35 | 350 | X | X |
| B-23 | 67 | 33 | 360 | X | X |
| B-24 | 68 | 32 | 360 | X | X |
| B-25 | 64 | 36 | 360 | X | X |
| B-26 | 64 | 36 | 360 | X | X |
| B-27 | 67 | 33 | 360 | X | X |
| B-28 | 47 | 53 | 340 | X | X |

The leakage owing to exfoliation is observed in most of the sealing structure bodies produced using the lead-free low-melting point glass compositions B-01 to B-18, and B-20 to B-28 as the comparative examples in the HAST. No leakage is observed in the comparative examples B-05, B-06, B-08 to B-11, providing the highly reliable sealing part. Because of high softening points $T_S$ of the respective lead-free low-melting point glass compositions B-05, B-06, B-08 to B-11, the sealing temperature has to be made high, resulting in difficulty in sealing at 370° C. or lower. In other words, it is difficult for the lead-free low-melting point glass compositions as comparative examples to improve reliability of the sealing part while lowering the sealing temperature.

On the contrary, the sealing structure bodies produced using the lead-free low-melting point glass compositions A-01 to A-38 according to the embodiment has no leakage owing to exfoliation in the HAST, succeeding in lowering the sealing temperature to 370° C. or lower. It is found that the embodiment allows lowering of the softening point $T_S$ of the lead-free low-melting point glass composition so that the highly reliable sealing part is obtained even at the sealing temperature equal to or lower than 350° C. That is, the lead-free low-melting point glass composition according to the embodiment allows lowering of the sealing temperature and improvement in reliability of the sealing part.

The lead-free low-melting point glass compositions A-01 to A-38 shown in Table 1 according to the embodiment are compared with those B-01 to B-18 and B-20 to B-28 so as to examine the difference therebetween. The lead-free low-melting point glass composition according to the embodiment contains no phosphorus oxide ($P_2O_3$), but contains vanadium oxide ($V_2O_5$), tellurium oxide ($TeO_2$), alkali metal oxide ($R_2O$), iron oxide ($Fe_2O_3$), barium oxide (BaO), and tungsten oxide ($WO_3$), and at least any one of additional components including yttrium oxide ($Y_2O_3$), lanthanum oxide ($La_2O_3$), cerium oxide ($CeO_2$), erbium oxide ($Er_2O_3$), ytterbium oxide ($Yb_2O_3$), aluminum oxide ($Al_2O_3$), and gallium oxide ($Ga_2O_3$). The content of $TeO_2$ is equal to or more than 25 mol %, and equal to or less than 43 mol %. The content of $R_2O$ is equal to or more than 4 mol %, and equal to or less than 27 mol %.

The use of $Li_2O$, $Na_2O$, and $K_2O$ as alkali metal oxide $R_2O$ has been examined in the embodiment. Additionally, the use of $Rb_2O$ and $Cs_2O$ is expected to provide similar effects to those described above. It is preferable to use $Li_2O$, $Na_2O$, and $K_2O$ in view of the glass material cost. The appropriate content of the alkali metal oxide is in the range from 4 mol % to 27 mol %. It has been recognized that the use of $K_2O$ at low $R_2O$ content in the range, and the use of $Li_2O$ at high $R_2O$ content in the range indicate the tendency of more advantageous contribution to lowering of the characteristic temperature and suppression of chemical stability deterioration.

The density of the lead-free low-melting point glass composition derived from the embodiment is 4.1 g/cm$^3$ or lower, and the second endothermic peak temperature (softening point) in the differential thermal analysis is 350° C. or lower. The density and the softening point of the more preferable lead-free low-melting point glass composition are 3.8 g/cm$^3$ or lower, and 330° C. or lower, respectively.

The following embodiment will explain in detail about the glass composite material containing the lead-free low-melting point glass composition according to the present invention, the glass paste, and the sealing structure body and an electric/electronic components to which those glass composite material and the glass paste have been applied.

Second Embodiment

In a second embodiment, the glass composite material containing the lead-free low-melting point glass composition, and ceramic particles or beads is used for sealing the respective peripheral outlines of the same kinds of metal substrates, ceramic substrates, and glass substrates so as to produce the sealing structure body like the first embodiment. The thus produced sealing structure body is subjected to the HAST for 48 hours for evaluating reliability of the sealing part. Four kinds of the lead-free low-melting point glass compositions A-05, A-14, A-24, and A-32 shown in Table 1 are used, and ten kinds of the ceramic particles or beads C-01 to C-10 shown in Table 5 are used. Table 5 also shows data of density, thermal expansion coefficient, and average particle size of the ceramic particles or beads which have been used in the embodiment.

TABLE 5

Density, thermal expansion coefficient, and average particle size of ceramic particles or ceramic beads

| No. | Ceramic | Density (g/cm$^3$) | Thermal expansion coefficent ($\times 10^{-7}$/° C.) | Average particle size (μm) |
| --- | --- | --- | --- | --- |
| C-01 | Ziroconium phosphate tungstate $Zr_2(WO_4)(PO_4)_2$ | 3.8 | −32 | 15 |
| C-02 | Quartz glass $SiO_2$ | 2.2 | 5 | 75 |
| C-03 | Borosilicate glass $SiO_2$—$B_2O_3$—$Na_2O$ based glass | 2.3 | 56 | 66 |
| C-04 | Soda-lime glass $SiO_2$—$Na_2O$—CaO based glass | 2.5 | 88 | 105 |
| C-05 | β-eucryptite $Li_2O \cdot Al_2O_3 \cdot 2SiO_2$ | 2.4 | −60 | 7 |
| C-06 | Cordierite $2MgO \cdot 2Al_2O \cdot 5SiO_2$ | 2.5 | 1 | 6 |
| C-07 | Zirconium silicate $ZrSiO_4$ | 4.6 | 45 | 9 |
| C-08 | Alumina $Al_2O_3$ | 4.0 | 81 | 53 |
| C-09 | Mullite $3Al_2O \cdot 2SiO_2$ | 3.2 | 33 | 7 |
| C-10 | Niobium oxide $Nb_2O_5$ | 4.6 | 12 | 5 |

A 50 mm×50 mm aluminum (Al) substrate with thickness of 3 mm is used for the metal substrate. A 50 mm×50 mm alumina ($Al_2O_3$) substrate with thickness of 1.5 mm is used for the ceramic substrate. A 50 mm×50 mm borosilicate glass ($SiO_2$—$B_2O_3$—$Na_2O$ based glass) substrate with thickness of 2 mm is used for the glass substrate. The thermal expansion coefficients of the aluminum substrate, the alumina substrate, and the borosilicate glass substrate are 224×10$^{-7}$/° C., 81×10$^{-7}$/° C., and 58×10$^{-7}$/° C., respectively. In production of the sealing structure body to be evaluated, firstly, the glass paste containing particles of the lead-free low-melting point glass composition, ceramic particles or beads, the binder, and the solvent is produced. Then the produced glass paste is applied to the respective peripheral outlines of the substrates like the first embodiment. After execution of drying and firing process, the spacers are disposed, and heated together with the counter substrate for sealing.

(Production of Glass Paste)

The glass paste is produced like the first embodiment except that the mixture ratio between particles of the lead-free low-melting point glass composition and the ceramic particles or beads is changed. In this case, there are eight types of mixture ratio between particles of the lead-free low-melting point glass composition, and the ceramic particles or beads, specifically, 100:0, 90:10, 80:20, 70:30, 60:40, 50:50, 40:60, and 30:70 in terms of vol %. The solid content (the sum of lead-free glass composition and ceramic) of the glass paste is set to approximately 80 mass %.

(Production and Evaluation of Sealing Structure Body)

The sealing structure body is prepared like the first embodiment, and subjected to the HAST for 48 hours for evaluating reliability of the sealing part. The sealing temperature of the sealing structure body is determined in accordance with the lead-free low-melting point glass composition contained in the glass composite material. Like the first embodiment, the sealing temperature corresponding to the content of A-05 is set to 370° C., the sealing temperature corresponding to the contents of A-14 and A-24 is set to 350° C., and the sealing temperature corresponding to the content of A-32 is set to 310° C. Upon production of the sealing structure body, the lead-free low-melting point glass composition, and the type and content of the ceramic contained in the glass paste are selected in consideration of the thermal expansion coefficient values of the respective substrates.

Tables 6 to 8 show evaluation results of the HAST conducted for the sealing structure bodies including the respective substrates. Table 6 shows evaluation results of the sealing structure body including the aluminum (Al) substrates. Table 7 shows evaluation results of the sealing structure body including the alumina ($Al_2O_3$) substrates. Table 8 shows evaluation results of the sealing structure body including the borosilicate glass ($SiO_2$—$B_2O_3$—$Na_2O$ based glass).

TABLE 6

Evaluation results of HAST (48 hours) for sealing structure body using aluminum (Al) substrates

| | | Content of lead-free glass composition (vol %) | | |
|---|---|---|---|---|
| Content of ceramic (vol %) | | 100 0 | 90 10 | 80 20 |
| A-24 | C-03 | ○ | ○ | ○ |
| | C-04 | ○ | ○ | ○ |
| | C-07 | ○ | ○ | ○ |
| | C-08 | ○ | ○ | ○ |
| | C-09 | ○ | ○ | ○ |
| | C-10 | ○ | ○ | ○ |
| A-32 | C-03 | ○ | ○ | ○ |
| | C-04 | ○ | ○ | ○ |
| | C-07 | ○ | ○ | ○ |
| | C-08 | ○ | ○ | ○ |
| | C-09 | ○ | ○ | ○ |
| | C-10 | ○ | ○ | ○ |

TABLE 7

Evaluation results of HAST (48 hours) for sealing structure body using alumina ($Al_2O_3$) substrates

| | | Content or lead-free glass composition (vol %) | | |
|---|---|---|---|---|
| Content of ceramic (vol %) | | 70 30 | 60 40 | 50 50 |
| A-14 | C-01 | ○ | ○ | ○ |
| | C-02 | ○ | ○ | ○ |
| | C-06 | ○ | ○ | ○ |
| A-32 | C-01 | ○ | ○ | ○ |
| | C-02 | ○ | ○ | ○ |
| | C-06 | ○ | ○ | ○ |
| A-32 | C-01 | ○ | ○ | ○ |
| | C-02 | ○ | ○ | ○ |
| | C-06 | ○ | ○ | ○ |

TABLE 8

Evaluation results of HAST (48 hours) for sealing structure body using borosilicate glass ($SiO_2$—$B_2O_3$—$Na_2O$ based glass) substrates

| | | Content of lead-free low-melting point glass composition (vol %) | | |
|---|---|---|---|---|
| Content of ceramic (vol %) | | 60 40 | 50 50 | 40 60 |
| A-05 | C-01 | ○ | ○ | ○ |
| | C-02 | ○ | ○ | ○ |
| | C-05 | ○ | ○ | ○ |

TABLE 8-continued

Evaluation results of HAST (48 hours) for sealing structure body using borosilicate glass ($SiO_2$—$B_2O_3$—$Na_2O$ based glass) substrates

| | | Content of lead-free low-melting point glass composition (vol %) | | |
|---|---|---|---|---|
| Content of ceramic (vol %) | | 60 40 | 50 50 | 40 60 |
| A-14 | C-01 | ○ | ○ | ○ |
| | C-02 | ○ | ○ | ○ |
| | C-05 | ○ | ○ | ○ |
| A-32 | C-01 | ○ | ○ | ○ |
| | C-05 | ○ | ○ | ○ |

In the case of the sealing structure body including the aluminum (Al) substrates, the ceramic of C-03, C-04, and C-07 to C-10 as shown in Table 6 is used, while setting the content ranging from 0 to 20 vol %. The use of the lead-free glass compositions A-24 and A-32 is evaluated in the range from 100 to 80 vol %. Under the entire conditions, no leakage owing to exfoliation is observed after conducting the HAST for 48 hours, providing the highly reliable sealing part. The use of either A-24 or A-32 is found to exhibit high adhesive strength and high tight contactness to the aluminum (Al) substrate.

In the case of the sealing structure body including the alumina ($Al_2O_3$) substrates, the ceramic of C-01, C-02, and C-06 as shown in Table 7 is used, while setting the content ranging from 30 to 50 vol %. The use of the lead-free glass compositions A-14, A-24, and A-32 is evaluated in the range from 70 to 50 vol %. Under the entire conditions, no leakage owing to exfoliation is observed after conducting the HAST for 48 hours, providing the highly reliable sealing part. The use of the lead-free low-melting point glass composition of either A-14, A-24, or A-32 is found to exhibit high adhesive strength and high tight contactness to the alumina ($Al_2O_3$) substrate.

In the case of the sealing structure body including the borosilicate glass ($SiO_2$—$Ba_2O_3$—$Na_2O$ based glass) substrates, the ceramic of C-01, C-02, and C-05 as shown in Table 8 is used, while setting the content ranging from 40 to 60 vol %. The use of the lead-free glass compositions A-05, A-14, or A-32 is evaluated in the range from 60 to 40 vol %. Under the entire conditions, no leakage owing to exfoliation is observed after conducting the HAST for 48 hours, providing the highly reliable sealing part. The use of the lead-free low-melting point glass composition of either A-05, A-14, or A-32 is found to exhibit high adhesive strength and high tight contactness to the borosilicate glass ($SiO_2$—$B_2O_3$—$Na_2O$ based glass) substrate.

The use of the glass composite material containing lead-free low-melting point glass composition according to the present invention by 40 to 100 vol % or under, and ceramic particles and beads by 0 to 60 vol % is found to allow low-temperature air-tight sealing and low-temperature adhesion to the respective substrates. In the embodiment, the use of the lead-free low-melting point glass composition of A-05, A-14, and A-32 has been described as a representative example. However, it is to be easily understood that the use of any other lead-free low-melting point glass composition according to the present invention may achieve performance equivalent to the one as described above. The explanation has been made with respect to the use of zirconium phosphate tungstate ($Zr_2(WO_4)(PO_4)_2$), quartz glass ($SiO_2$), borosilicate glass ($SiO_2$—$B_2O_3$ base), soda-lime glass ($SiO_2$—$Na_2O$—CaO base), S-eucryptite ($Li_2O.Al_2O_3.2SiO_2$), cordierite ($2MgO.2Al_2O_3.5SiO_2$), zirconium silicate ($ZrSiO_4$), alumina ($Al_2O_3$), mullite ($3Al_2O_3.2SiO_2$), and niobium oxide ($Nb_2O_5$) for the ceramic particles or beads to be contained in the glass composite material and the glass paste in a non-restricted manner.

Third Embodiment

Figure 6A:
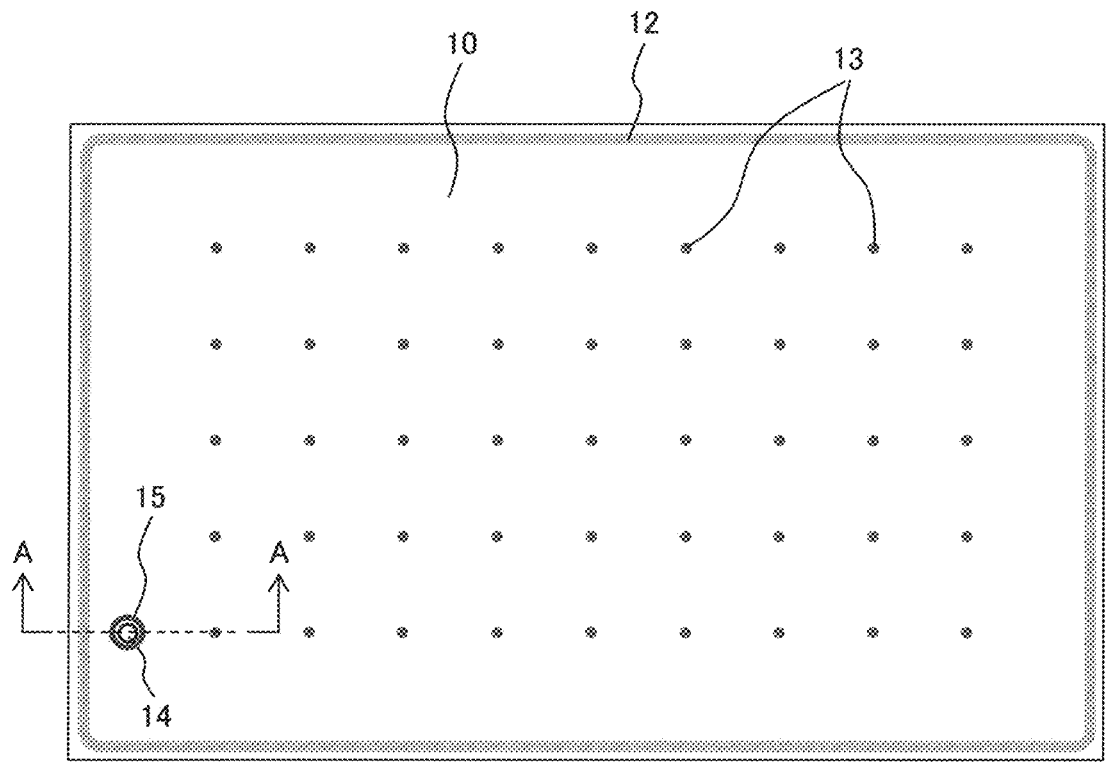
FIG. 6A is a schematic top view of a vacuum heat insulating multilayer glass panel according to a third embodiment.
Figure 6B:
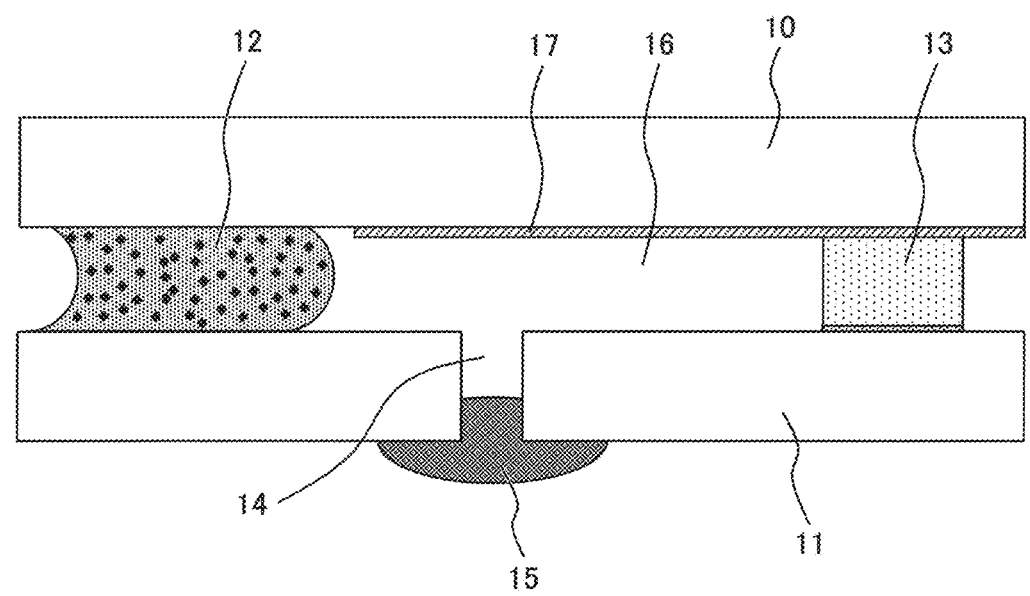
FIG. 6B is a sectional view taken along line A-A of FIG. 6A.

In a third embodiment, two air-quench reinforced soda-lime glass substrates, and the glass composite material are used to produce a vacuum heat insulating multilayer glass panel as a representative example of the sealing structure body as shown in FIGS. 6A and 6B.

FIG. 6A is a schematic plan view of the produced vacuum heat insulating multilayer glass panel. FIG. 6B is an enlarged sectional view of a region around the sealing part, taken along line A-A of FIG. 6A. As shown in FIG. 6A, the vacuum heat insulating multilayer glass panel includes a sealing part 12 applied to peripheral edges of an air-quench reinforced soda-lime glass substrate 10 and an air-quench reinforced soda-lime glass substrate (code 11 as shown in FIG. 6B), which are laminated while having a gap therebetween. A plurality of spacers 13 are disposed between those substrates 10, 11 two-dimensionally at equal intervals. The air-quench reinforced soda-lime glass substrate 11 includes an exhaust hole 14 for emission carried by a vacuum pump (not shown) from the gap between those two substrates 10, 11. A cap 15 is attached to the exhaust hole 14.

As shown in FIG. 6B, a space 16 (the gap as described above) is formed between the pair of air-quench reinforced soda-lime glass substrates 10 and 11 having the sealing part 12 applied to the peripheral outlines (peripheral edges). The space 16 is in a vacuum state. The glass composite material according to the present invention is used for forming the sealing part 12. The vacuum heat insulating multilayer glass panel may be applied to the window glasses for buildings, vehicles, and doors for commercial refrigerators and freezers. The glass composite material according to the present invention, which has been used for the sealing part 12 contains the ceramic particles or beads with a small thermal expansion coefficient in order to ensure consistency of the thermal expansion coefficients of the air-quench reinforced soda-lime glass substrates 10, 11 in addition to the lead-free low-melting point glass composition according to the present invention. A compression reinforced layer is formed on each surface of the air-quench reinforced glass substrates 10, 11. In heating at the temperature exceeding 320° C., the reinforced layer is gradually reduced, and in further heating at 400° C. or higher, it disappears. Therefore, it is preferable to set the sealing temperature as low as possible. The sealing part 12 has to be formed at the temperature at least lower than 370° C. Each of the air-quench reinforced soda-lime glass substrates 10, 11 exhibits the low thermal conductivity. Further enlargement of the substrates will make it difficult to perform uniform heating and cooling. Furthermore, rapid heating and rapid cooling may be the cause of damaging the substrates. Consequently, they have to be gradually heated and cooled in the sealing process. The sealing at the temperature as low as possible is effective for efficient production of the vacuum heat insulating multilayer glass panel in a high yield. If possible, it is desirable to perform the sealing at the temperature equal to or lower than 350° C.

The space 16 between the air-quench reinforced glass substrates 10 and 11 is kept in the vacuum state by the spacers 13. The vacuum pump is used for evacuating the space 16 through the exhaust hole 14 that has been preliminarily formed in the air-quench reinforced soda-lime glass substrate 11. After the evacuation, the cap 15 is attached to the hole so as to keep the space 16 in the vacuum state. If the sealing structure body is applied to the window glass for buildings or vehicles, a heat ray reflection film 17 may be preliminarily applied to the inner surface of the air-quench reinforced soda-lime glass substrate 10 through the evaporation method and the like.

(Production of Glass Paste)

The glass paste is produced by combining and mixing particles of the lead-free low-melting point glass composition, the ceramic particles and beads, the binder, and the solvent in the predetermined ratio. The particles of the lead-free low-melting point glass composition A-24 with particle size under 45 μm are used. Particles and beads of ceramic C-01 (particles of zirconium phosphate tungstate) with average particle size of approximately 15 μm, and ceramic C-02 (quartz glass beads) with average particle size of approximately 75 μm are used. For the binder and the solvent, polypropylene carbonate and dihydroterpineol are used, respectively. The glass paste for sealing is produced by setting the mixture ratio of particles of the lead-free low-melting point glass composition A-24, the ceramic particles C-01, and the ceramic beads C-02 to 50:30:20 in terms of vol % so as to have the solid content (the sum of A-24, C-01, C-02) set to approximately 80 mass %. The glass paste containing solid particles of only A-24 is also produced for fixing the spacers 13.

(Production of Vacuum Heat Insulating Multilayer Glass Panel)

The method of producing the vacuum heat insulating multilayer glass panel of the embodiment will be described referring to FIGS. 7A to 10.

Figure 7A:
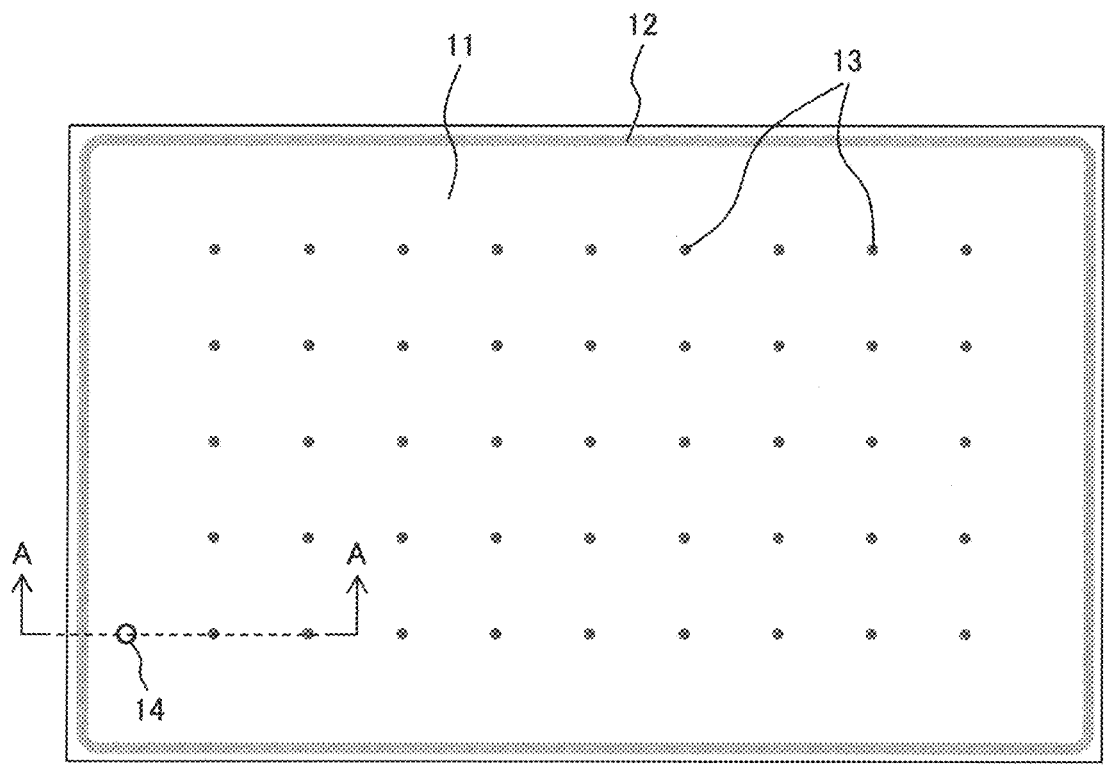
FIG. 7A is a view showing a part of the process for producing the vacuum heat insulating multilayer glass panel according to the third embodiment.

FIG. 7A is a view showing a state where the sealing part 12 and the spacers 13 are formed on the air-quench reinforced soda-lime glass substrate 11 constituting the vacuum heat insulating multilayer glass panel as shown in FIGS. 6A and 6B. As shown in FIG. 7A, the glass paste produced as described above is applied to the peripheral outline (sealing part 12) of the air-quench reinforced soda-lime glass substrate 11 through the dispenser method. The spacers 13 are disposed at the inner side using the glass paste for fixing spacer. The substrate is dried in the atmosphere at 150° C., and heated up to 350° C. at the temperature rise rate of 2 to 3° C./minute in the atmosphere. After holding the substrate for 30 minutes, the sealing part 12 and the spacers 13 are temporarily fixed to the air-quench reinforced soda-lime glass substrate 11.

Figure 7B:
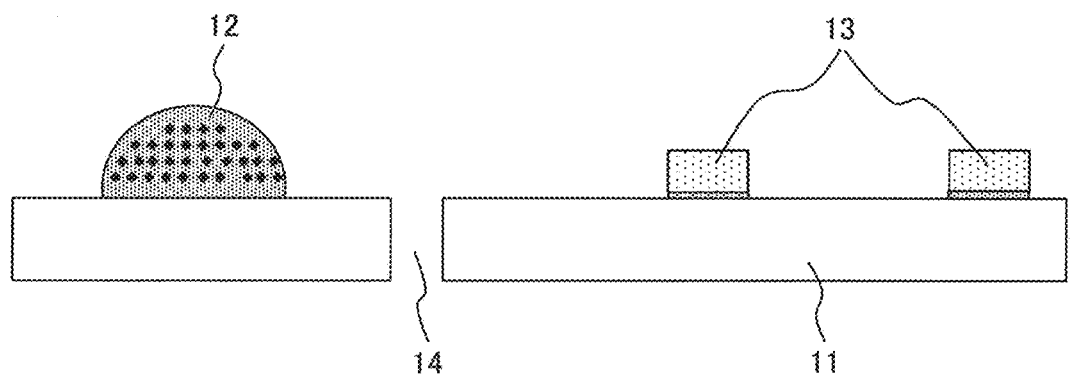
FIG. 7B is a sectional view taken along line A-A of FIG. 7A.

FIG. 7B is a sectional view taken along line A-A of FIG. 7A. Referring to FIG. 7B, it is essential to make the temporarily fixed sealing part 12 higher than the temporarily fixed spacers 13 for accomplishing the air-tight sealing. The embodiment employs 900×600×3 mm air-quench reinforced soda-lime substrate 10, and the air-quenched reinforced soda-lime glass substrate 11 having the exhaust hole 14. The heat ray reflection film 17 is applied to the air-quench reinforced soda-lime glass substrate 10. In order to set the gap between the air-quench reinforced soda-lime glass substrates 10 and 11, in other words, the height of the space 16 to approximately 200 μm, the spacer 13 formed as a stainless steel columnar shape with diameter of 500 μm and height of 190 μm is fixed to the other substrate using the lead-free low-melting point glass composition A-24 as shown in Table 1.

Figure 8A:
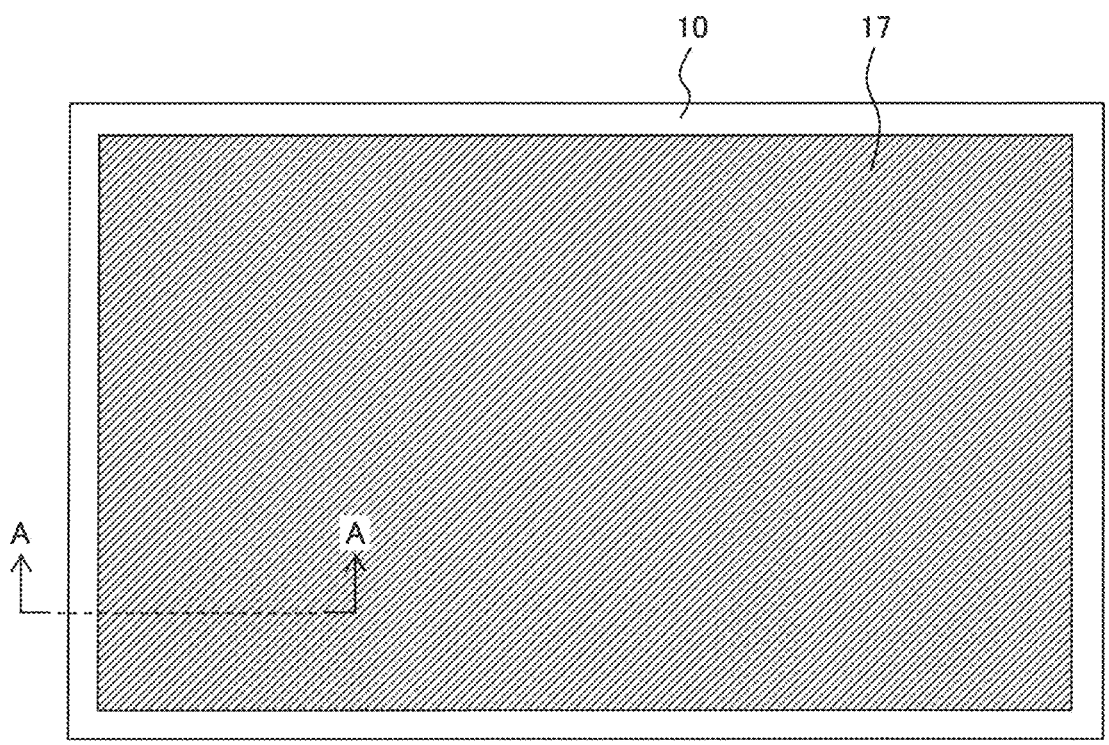
FIG. 8A is a schematic top view of an air-quench reinforced soda-lime glass substrate.
Figure 8B:
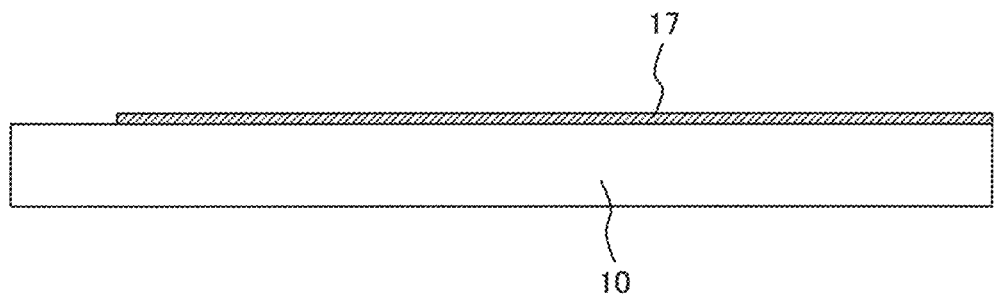
FIG. 8B is a sectional view taken along line A-A of FIG. 8A.

FIG. 8A shows the air-quench reinforced soda-lime glass substrate 10 which constitutes the vacuum heat insulating multilayer glass panel as shown in FIG. 6B. FIG. 8B is a sectional view taken along line A-A of FIG. 8A. As shown in FIGS. 8A and 8B, the heat ray reflection film 17 is applied to one side of the air-quench reinforced soda-lime glass substrate 10.

Figure 9:
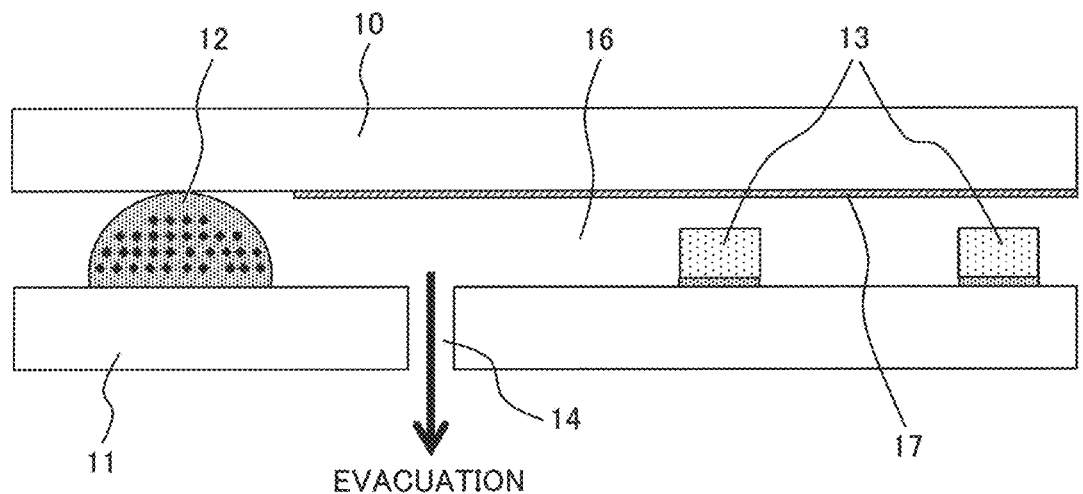
FIG. 9 is a sectional view showing a state where the vacuum heat insulating multilayer glass panel is in the production process according to the third embodiment.
Figure 9:
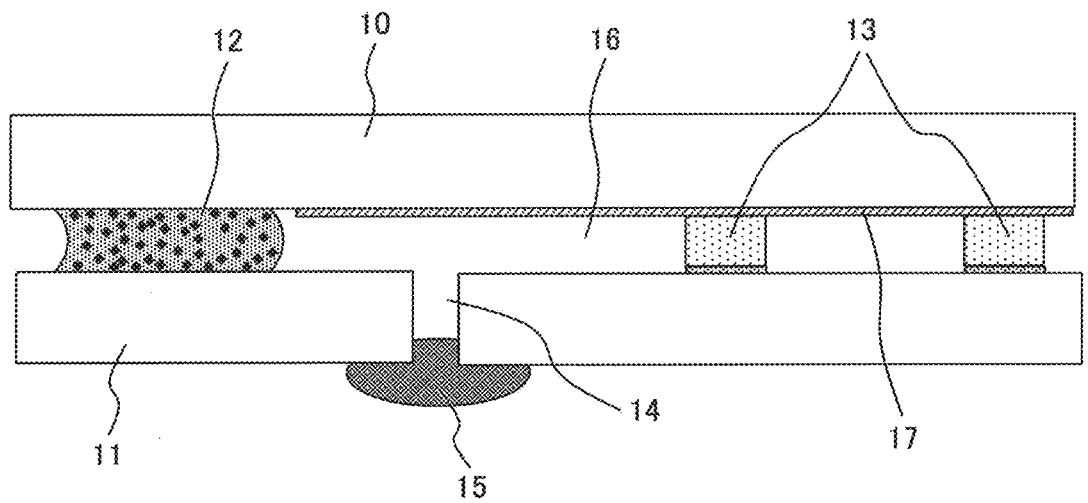

FIG. 9 is a sectional view showing the vacuum heat insulating multilayer glass panel as shown in FIGS. 6A and 6B in its production process (last process step). Referring to FIG. 9, the air-quench reinforced soda-lime glass substrates 10, 11 are placed to face with each other while being positionally aligned, and fixed with a plurality of heat resistant clips. The resultant structure is heat treated while being vacuum evacuated from the exhaust hole 14 for sealing.

Figure 10:
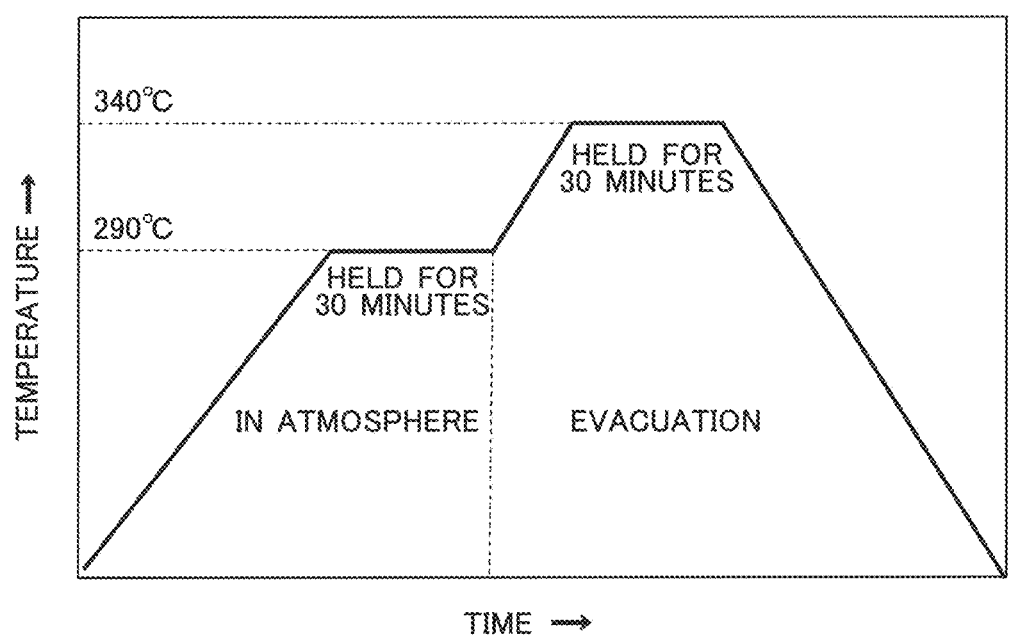
FIG. 10 is a sealing temperature profile obtained in the process of producing the vacuum heat insulating multilayer glass panel according to the third embodiment.

FIG. 10 is a view showing a sealing temperature profile obtained in the heat treatment process. The sealing temperature profile as shown in FIG. 10 is derived from the sealing process to be described below. In the process, the glass panel is heated at the temperature slightly higher than the yield point $M_g$ of the lead-free glass composition to be used at the temperature rise rate of 2 to 3° C./minute in the atmosphere, in this case, 290° C. slightly higher than the yield point $M_g$ of A-24. The resultant structure is held for 30 minutes, and heated at the temperature approximately 20° C. higher than the softening point $T_s$ of the lead-free glass composition to be used at the temperature rise rate of 2 to 3° C./minute, that is, up to 340° C. higher than the softening point $T_S$ of A-24 by 19° C. while having the inside of the panel evacuated from the exhaust hole 14 with the vacuum pump. The resultant structure is held for 30 minutes, and sealed.

As shown in FIG. 9, the sealing part 12 and the spacers 13 are crushed in the heat treatment process, and brought into tight contact with the two air-quench reinforced soda-lime glass substrates 10, 11. Thereafter, the cap 15 is attached to the exhaust hole 14 to produce the vacuum heat insulating multilayer glass panel. In the embodiment, ten of the above-described vacuum heat insulating multilayer glass panels are produced.

(Evaluation Result of Produced Vacuum Heat Insulating Multilayer Glass Panel)

Firstly, ten of the produced vacuum heat insulating multilayer glass panels according to the embodiment are subjected to a visual inspection. From the result, no cracking nor crazing is observed, indicating no problem on appearance. The air-quench reinforced soda-lime glass substrates 10 and 11 are substantially uniformly spaced (approximately 200 μm) by the spacers 13 disposed inside the panel. In other words, the vacuum heat insulating multilayer glass panel with the predetermined space 16 is produced. As the inside of the panel is kept in the vacuum state through the helium leak test, the peripheral outline of the panel is observed to be air-tightly sealed. The result of evaluating the thermal insulation property shows accomplishment of the low coefficient of overall heat transmission (0.7 to 0.9 W/m²·K).

In order to confirm reliability of the sealing part 12, three of the produced vacuum heat insulating multilayer glass panels are subjected to the HAST for 48 hours. All the three tested panels are observed to have the respective inner parts kept in the vacuum state with no water filtration. Three of additional vacuum heat insulating multilayer glass panels are subjected to the temperature cycle test at the temperature ranging from −50° C. to +100° C. 1500 times. All the three tested panels are observed to have the respective inner parts kept in the vacuum state. With these facts, the vacuum heat insulating multilayer glass panel applied with the glass composite material according to the present invention and applied with the glass paste produced by using such material is observed to be able to provide the sealing part 12 with high heat insulating property and high reliability. Clearly, the use of the glass composite material according to the present invention and the glass paste produced by using such material allows lowering of the sealing temperature, thus significantly contributing to productivity improvement of the vacuum heat insulating multilayer glass panel, and application to the air-quench reinforced soda-lime glass substrate.

It is confirmed that the glass composite material that contains the lead-free low-melting point glass composition according to the present invention as well as the glass paste produced by using such material are effectively applicable to the sealing part of the vacuum heat insulating multilayer glass panel, succeeding in providing the sealing structure body excellent in both reliability and productivity.

Fourth Embodiment

In this embodiment, a display having a large number of organic light emitting diodes (OLED) incorporated between two borosilicate glasses is produced as a representative example of the sealing structure body.

Figure 11A:
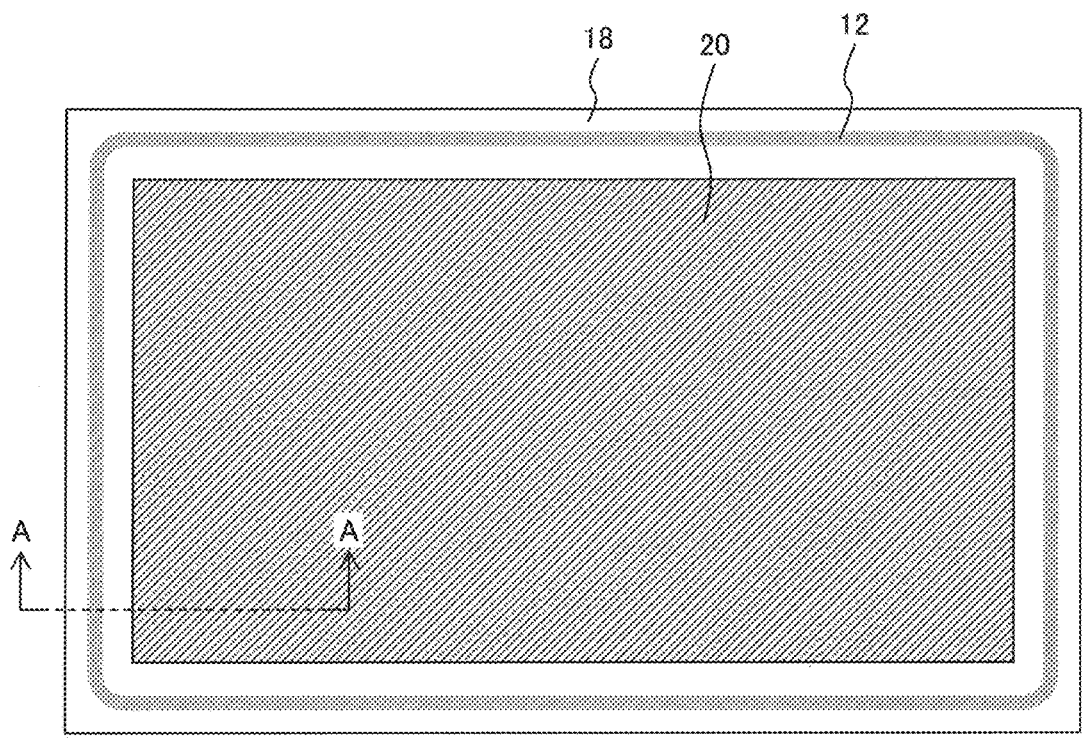
FIG. 11A is a schematic top view of an organic light-emitting diode (OLED) display according to a fourth embodiment.
Figure 11B:
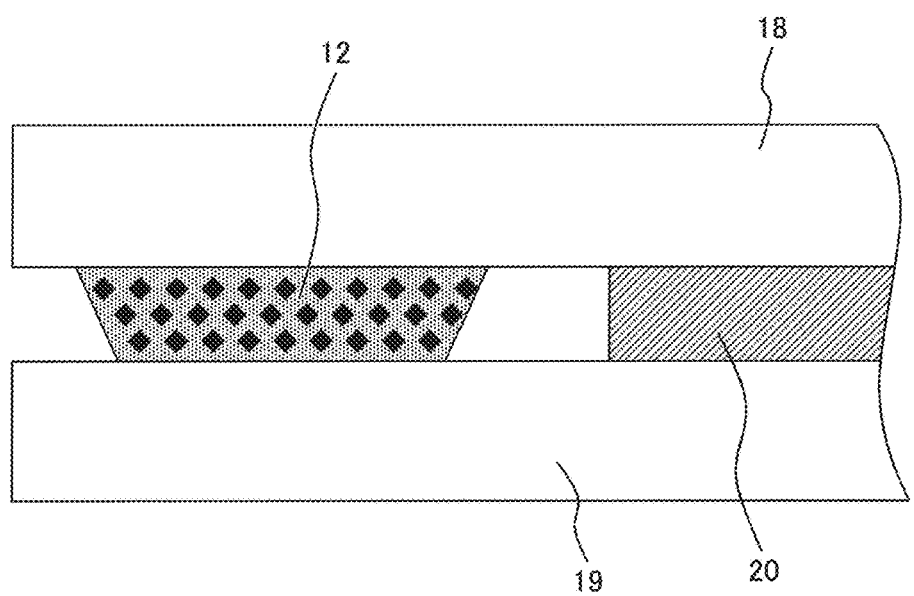
FIG. 11B is a sectional view taken along line A-A of FIG. 11A.

FIG. 11A is a schematic plan view showing an example of the OLED display. FIG. 11B is a sectional view taken along line A-A of FIG. 11A. Referring to FIG. 11A, the OLED display includes the sealing part 12 as the glass composite material according to the present invention, which is applied to the peripheral outline of a borosilicate glass substrate 18, and a borosilicate glass substrate (code 19 as shown in FIG. 11B) layered thereon while having the gap therebetween. The OLEDs 20 are incorporated between the borosilicate glass substrates 18 and 19.

(Production of Glass Paste)

The glass paste is produced by combining and mixing particles of the lead-free low-melting point glass composition according to the present invention, the ceramic particles, the binder, and the solvent in the predetermined ratio. The particles of the lead-free low-melting point glass composition A-05 with average particle size of approximately 2 μm are used. The particles of ceramic C-01 (zirconium phosphate tungstate particles) with average particle size of approximately 3 μm are used. For the binder and the solvent, polypropylene carbonate and dihydroterpineol are used, respectively. The particle of the ceramic C-01 is prepared by containing iron tungstate ($FeWo_4$) in the zirconium phosphate tungstate particles for heat generation by efficiently absorbing red semiconductor laser, which will be described later. The glass paste for low temperature sealing is produced by setting the mixture ratio between particles of the lead-free low-melting point glass composition A-05 and the ceramic particle C-01 to 45:55 in terms of vol % so that the content of the solid (the sum of A-05 and C-01) becomes approximately 80 mass %.

(Production of Organic Light Emitting Diode (OLED) Display)

FIGS. 12A to 14 show the method of producing the OLED display according to the embodiment.

Figure 12A:
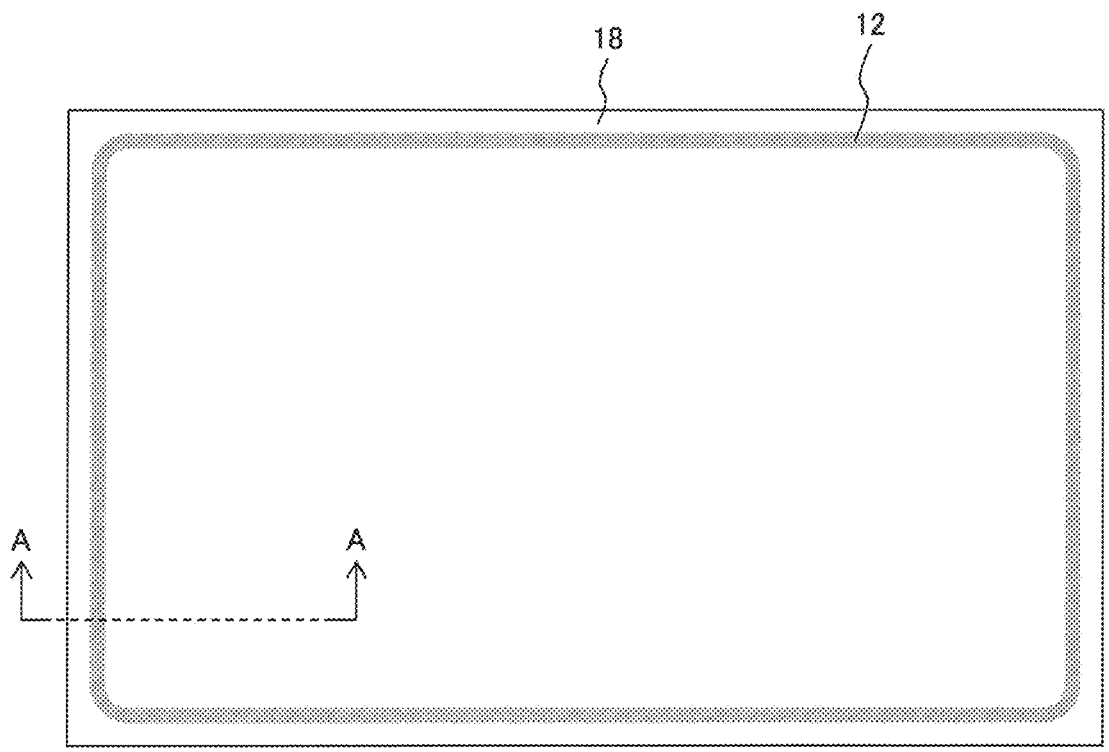
FIG. 12A is a schematic top view of the OLED display according to the fourth embodiment.
Figure 12B:
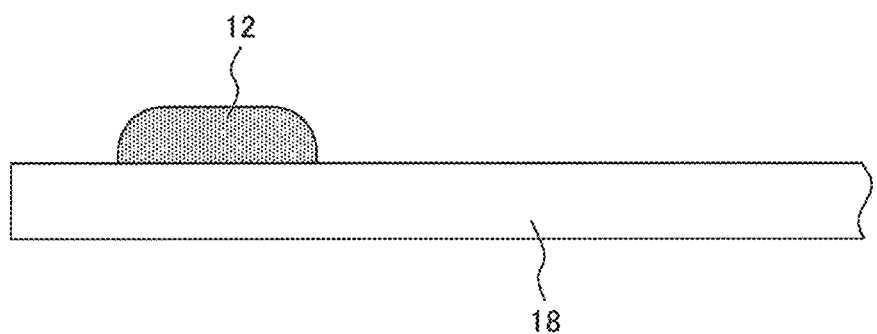
FIG. 12B is a sectional view taken along line A-A of FIG. 12A.

FIG. 12A shows one of substrates constituting the OLED display. FIG. 12B is a sectional view taken along line A-A of FIG. 12A. As shown in FIG. 12A, the produced glass paste as described above is applied to the peripheral outline of the borosilicate glass substrate 18 through the screen printing method. The substrate is dried in the atmosphere at 150° C., heated up to 370° C. at the temperature rise rate of 5° C./minute in the atmosphere, and held for 30 minutes to form the sealing part 12 on the peripheral outline of the borosilicate glass substrate 18. The sealing part 12 is formed on the peripheral outline of the borosilicate glass substrate 18 so as to have the line width of approximately 2 mm, and the fired film thickness of approximately 15 µm.

Figure 13A:
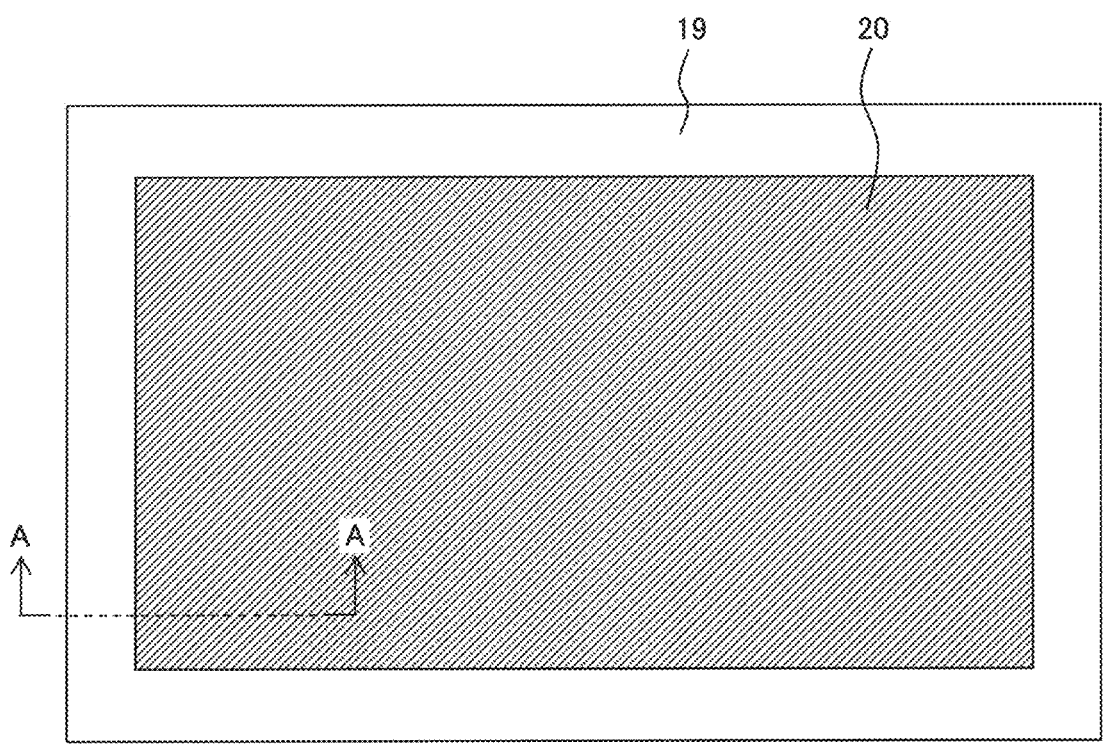
FIG. 13A is a schematic top view of the OLED display according to the fourth embodiment.
Figure 13B:
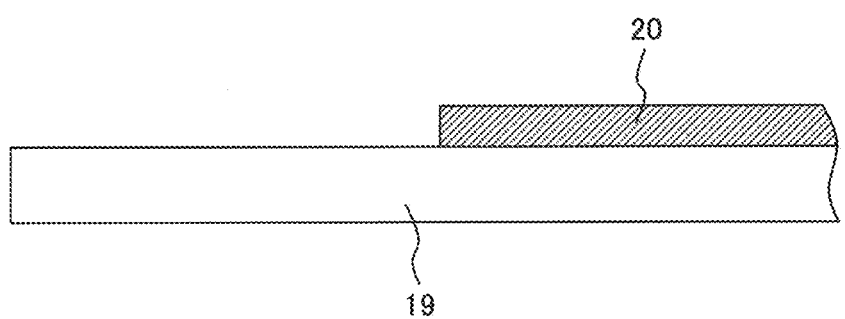
FIG. 13B is a sectional view taken along line A-A of FIG. 13A.
Figure 14:
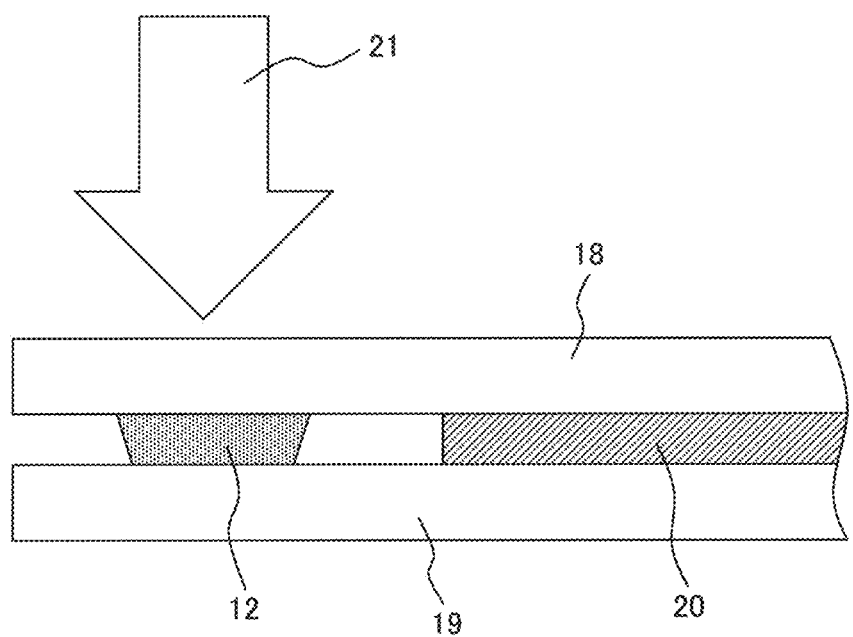
FIG. 14 is a schematic sectional view showing a part of the process of producing the OLED display according to the fourth embodiment.

FIG. 13A shows the other substrate constituting the OLED display. FIG. 13B is a sectional view taken along line A-A of FIG. 13A. As shown in these drawings, a large number of OLEDs 20 corresponding to the number of pixels are formed on a borosilicate glass substrate 19. The borosilicate glass substrate 19 with the OLEDs 20 formed thereon and the borosilicate glass substrate 18 with the sealing part 12 applied thereto are placed to face with each other as shown in FIG. 14. In the above-described state, a laser 21 is irradiated in the vacuum state in the direction from the borosilicate glass substrate 18 to the sealing part 12. The red semiconductor laser with wavelength of 805 nm is used for the laser 21 so as to allow efficient absorption of the laser wavelength, and heat generation by the lead-free low-melting point glass composition in the glass composite material according to the present invention, and the low thermal expansion ceramic particles, and to facilitate softening fluidity of the lead-free low-melting point glass composition. The laser 21 is moved along the peripheral outline at the rate of 10 mm/second for bonding the respective peripheral outlines of the borosilicate glass substrates 18 and 19 at the sealing part 12 so as to produce the OLED display.

In the embodiment, five OLED displays are produced. The laser is used for sealing in order to prevent thermal damage to the OLED, and to improve productivity.

(Evaluation Result of Produced Organic Light Emitting Diode (OLED) Display)

Firstly, a lighting test is conducted for the produced OLED display. From the result, normal lighting without any problems is confirmed as well as excellent tight contactness and adhesiveness at the sealing part. After conducting the HAST for 48 hours, the lighting test is conducted for the OLED display in the similar manner. The OLED display sealed with only resin is added as a comparative example. The line width and the thickness of the resin sealing part are approximately 5 mm, and approximately 15 µm, respectively. The resin sealed OLED display is found to have a large degree of degradation. The above-described degradation is thought to have been caused by moisture and oxygen introduced to the inside of the OLED display through the resin sealing part to deteriorate the OLED. On the contrary, the display produced according to the present invention exhibits satisfactory results with no degradation confirmed, indicating good retention of air-tightness. From the result of evaluating the tight contactness and adhesiveness at the sealing part after conducting the HAST, a large degree of degradation as observed at the resin sealing part is not found, indicating substantially the similar state to the one before conducting testing.

It is confirmed that the glass composite material that contains the lead-free low-melting point glass composite according to the present invention, and the glass paste produced by using such material are efficiently applicable to the sealing part of the OLED, providing the sealing structure body with high functionality which includes reliability, and excellent productivity.

Fifth Embodiment

In this embodiment, a crystal resonator package is produced as one of representative examples of the sealing structure body.

(Production of Glass Paste)

The glass paste for forming the sealing part 12 is produced by combining and mixing particles of the lead-free low-melting point glass composition, the ceramic particles, the binder, and the solvent. The particles of the lead-free low-melting point glass composition A-13 with average particle size of approximately 3 µm are used. The particles of ceramic C-01 (zirconium phosphate tungstate particles) with average particle size of approximately 15 µm as shown in Table 5 are used. For the binder and the solvent, polypropylene carbonate and dihydroterpineol are used, respectively. The glass paste for forming the sealing part 12 is prepared by setting the mixture ratio between the particles of A-13 and the particles of C-01 to 60:40 in terms of vol % so that the content of the solid (the sum of A-13 and C-01) becomes approximately 80 mass %.

(Production of Crystal Resonator Package)

Figure 15A:
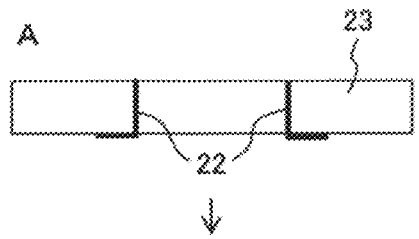
FIGS. 15A to 15F are schematic sectional views each showing the process of producing a crystal resonator package according to a fifth embodiment.
Figure 15B:
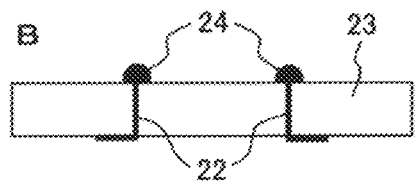
Figure 15C:
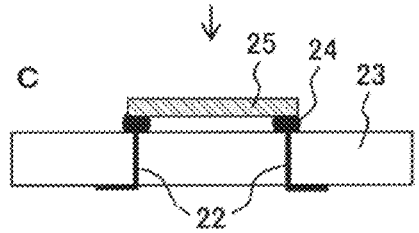

FIGS. 15A to 15F show a series of process steps for producing the crystal resonator package. FIG. 16 is a schematic sectional view of the produced crystal resonator package.

The crystal resonator package as shown in FIG. 16 includes a crystal resonator 25 disposed on a surface of a ceramic substrate 23 having wiring 22 via a conductive bonding part 24. The wiring 22 is electrically coupled with the conductive bonding part 24, by which the crystal resonator 25 is electrically coupled with the outside. A ceramic cap 26 which serves to protect the crystal resonator 25 is air-tightly adhered to an outer periphery of the ceramic substrate 23 with the sealing part 12. In this embodiment, the above-described glass paste is used for producing the sealing part 12, and alumina ($\alpha$-$Al_2O_3$) is used for producing the ceramic substrate 23 and the ceramic cap 26.

The method of producing the crystal resonator package will be described referring to FIGS. 15A to 15F. Firstly, the ceramic substrate 23 having the wiring 22 is produced (FIG. 15A). The conductive bonding part 24 is applied onto the wiring 22 (FIG. 15B). The crystal resonator 25 is placed on the conductive bonding part 24, and heated in the vacuum state so as to electrically couple the crystal resonator 25 with the conductive bonding part 24 (FIG. 15C).

Figure 15D:
Figure 15E:
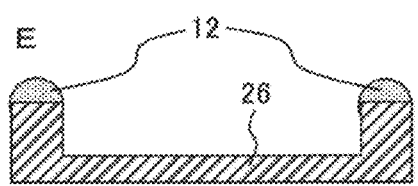
Figure 16:
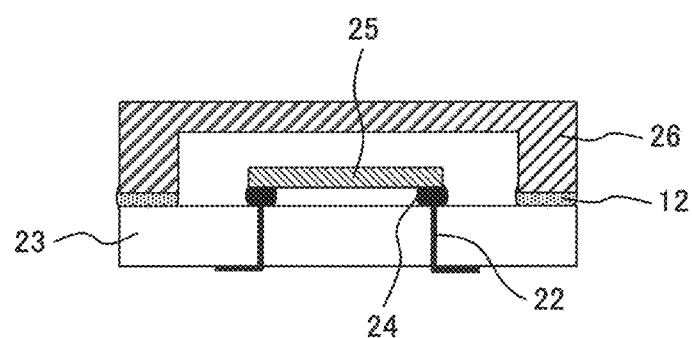
FIG. 16 is a schematic sectional view showing the crystal resonator package according to the fifth embodiment.

Meanwhile, the ceramic cap 26 is prepared (FIG. 15D). The glass paste containing the lead-free low-melting point glass composition particles and the ceramic particles is applied to the outer periphery of the ceramic cap 26 so as to be dried. The dried ceramic cap is heated in the atmosphere to make the lead-free low-melting point glass composition contained in the glass composite material into a softened fluidity state, forming the sealing part 12 (FIG. 15E). In this embodiment, the glass paste is applied through the screen printing method, and dried in the atmosphere at approximately 150° C. It is heated up to 360° C. at the temperature rise rate of 10° C./minute in the atmosphere, and held for 30 minutes to form the sealing part 12 on the outer periphery of the ceramic cap 26.

The ceramic substrate 23 having the crystal resonator 25 and the conductive bonding part 24 (FIG. 15C), and the ceramic cap 26 having the sealing part 12 (FIG. 15E) are put together, and heated in the inert gas or in vacuum while having a slight load 27 applied thereto to bring the lead-free low-melting point glass composition contained in the sealing part 12 into the softened fluidity state again (FIG. 15F), providing the crystal resonator package as shown in FIG. 16. The above-described process has to be executed by taking care not to cause exfoliation of the conductive bonding part 24 from the crystal resonator 25 and the wiring 22. Consequently, it is effective to bring the softening point $T_s$ of the lead-free low-melting point glass composition contained in the sealing part 12 as low as possible.

Figure 15F:
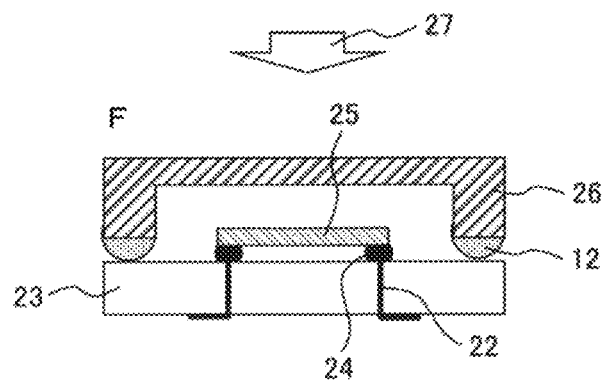

In this embodiment, the ceramic cap 26 having the sealing part 12 is set in alignment with the ceramic substrate 23 connected to the crystal resonator 25 as shown in FIG. 15F. The structure is mounted on an exclusive fixing jig having the load applied thereto. It is heated up to 360° C. at the temperature rise rate of 10° C./minute in the vacuum state, and held for 15 minutes. The ceramic cap 26 and the ceramic substrate 23 are sealed to produce the crystal resonator package. In this embodiment, 24 crystal resonator packages are produced.

(Result of Evaluating Produced Crystal Resonator Package)

Firstly, 18 crystal resonator packages produced according to the embodiment are subjected to the visual inspection. From the result, substantially no displacement of the ceramic cap 26 in sealing is observed. Furthermore, the crystal resonator packages have substantially no devitrification owing to crystallization, cracking, crazing at the sealing part 12, indicating no problem on appearance.

A continuity test for the wiring 22 on the back surface of the ceramic substrate 23 is conducted to confirm whether the conductive bonding part 24 inside the sealed ceramic cap 26 is electrically coupled with the crystal resonator 25 and the wiring 22. From the test results, all the produced crystal resonator packages are confirmed to have the respective crystal resonators operable. Five of the produced crystal resonator packages are subjected to the helium test to confirm that the inside of the package is in the vacuum state, having the peripheral outline air-tightly sealed with the sealing part 12. In order to confirm reliability of the sealing part 12, five of the produced crystal resonator packages are subjected to the HAST for 48 hours. Thereafter, the helium leak test is conducted, and all the crystal resonator packages subjected to the HAST are confirmed to have the air-tightness and tight contactness of the sealing part 12 retained.

It has been found that applying the glass composite material that contains the lead-free low-melting point glass composition according to the present invention, and the glass paste produced by applying such material to the sealing part may provide the highly reliable crystal resonator package while considering the influence on the environmental load.

The third to the fifth embodiments have been explained, taking the vacuum heat insulating multilayer glass panel, the OLED display, and the crystal resonator package as representative examples of the sealing structure body, respectively. However, the present invention is applicable to various sealing structure bodies without being limited to those described above.

LIST OF REFERENCE SIGNS 1, 2: glass substrate, 3: lead-free low-melting point glass composition, 4: low thermal expansion ceramic particle, 5: glass composite material, 6: spacer, 7: inner space, 8: glass composite material paste, 9: heat resistant clip, 10, 11: air-quench reinforced soda-lime glass substrate, 12: sealing part, 13: spacer, 14: exhaust hole, 15: cap, 16: space, 17: heat ray reflection film, 18, 19: borosilicate glass substrate, 20: organic light emitting diode (OLED), 21: laser, 22: wiring, 23: ceramic substrate, 24: conductive bonding part, 25: crystal resonator, 26: ceramic cap, 27: load

What is claimed is:

1. A lead-free glass composition which contains vanadium oxide, tellurium oxide, alkali metal oxide, iron oxide, barium oxide, and tungsten oxide while containing substantially no phosphorus oxide, the lead-free glass composition further containing at least one of additional components including yttrium oxide, lanthanum oxide, cerium oxide, erbium oxide, ytterbium oxide, aluminum oxide, and gallium oxide,
   wherein a content of the tellurium oxide is equal to or more than 25 mol %, and equal to or less than 43 mol % in terms of the oxide $TeO_2$; and
   a content of the alkali metal oxide is equal to or more than 4 mol %, and equal to or less than 27 mol % in terms of the oxide $R_2O$ (R: alkali metal element).

2. The lead-free glass composition according to claim 1, wherein the alkali metal oxide is at least one of $Li_2O$, $Na_2O$, and $K_2O$.

3. The lead-free glass composition according to claim 1, wherein contents (mol %) of the vanadium oxide, the tellurium oxide, the alkali metal oxide, the iron oxide, the barium oxide, and the tungsten oxide form relationships in terms of following oxides, including:

$$[V_2O_3]<2[R_2O]+6[Fe_2O_3]+2[BaO]<3.5[V_2O_5];$$

$$[WO_3]<[BaO]<[R_2O]+[Fe_2O_3]<[V_2O_5]<[TeO_2]+[R_2O]; \text{ and}$$

$$[R_2O]<6[Fe_2O_3].$$

4. The lead-free glass composition according to claim 1, wherein the alkali metal oxide $R_2O$ is $Li_2O$.

5. The lead-free glass composition according to claim 1, wherein a second endothermic peak temperature (softening point) in a differential thermal analysis of the lead-free glass composition is equal to 330° C. or lower, and a density of the lead-free glass composition is equal to 3.8 g/cm³ or lower.

6. The lead-free glass composition according to claim 1, wherein the content of $V_2O_3$ is equal to or more than 30.5 mol %, and equal to or less than 45 mol %, the content of $Fe_2O_3$ is equal to or more than 2.5 mol %, and equal to or less than 8 mol %, the content of BaO is equal to or more than 3 mol %, and equal to or less than 10 mol %, and the content of $WO_3$ is equal to or more than 1 mol %, and equal to or less than 6 mol % in terms of the oxides.

7. The lead-free glass composition according to claim 6, wherein the $R_2O$ content is equal to or more than 12 mol %, and equal to or less than 27 mol % in terms of the oxide.

8. The lead-free glass composition according to claim 1, wherein the content of the additional component is equal to or more than 0.5 mol %, and equal to or less than 4.5 mol % in terms of oxides $Y_2O_3$, $La_2O_3$, $CeO_2$, $Er_2O_3$, $Yb_2O_3$, $Al_2O_3$, and $Ga_2O_3$.

9. The lead-free glass composition according to claim 1,
   wherein the additional component is at least one of the yttrium oxide, the lanthanum oxide, and the aluminum oxide; and
   the content of the additional component is equal to or more than 1 mol %, and equal to or less than 3 mol % in terms of oxides $Y_2O_3$, $La_2O_3$, and $Al_2O_3$.

10. The lead-free glass composition according to claim 1, wherein the contents (mol %) of the additional components form a relationship in terms of following oxides of $$2[R_2O]+6[Fe_2O_3]+2[BaO]+6[Y_2O_3]+6[La_2O_3]+4[CeO_2]+6[Er_2O_3]+6[Yb_2O_3]+6[Al_2O_3]+6[Ga_2O_3]<3.5[V_2O_5].$$

11. A glass composite material containing the lead-free glass composition according to claim 1, and particles of ceramic or glass beads.

12. The glass composite material according to claim 11, wherein a content of the lead-free glass composition is equal to or more than 40 vol %, and less than 100 vol %; and a content of the ceramic is more than 0 vol %, and equal to or less than 60 vol %.

13. The glass composite material according to claim 11, wherein the ceramic or glass beads contains any one of zirconium phosphate tungstate ($Zr_2(WO_4)(PO_4)_2$), quartz glass ($SiO_2$), borosilicate glass ($SiO_2$—$B_2O_3$ base), soda-lime glass ($SiO_2$—$Na_2O$—$CaO$ base), β-eucryptite ($Li_2O.Al_2O_3.2SiO_2$), cordierite ($2MgO.2Al_2O_3.5SiO_2$), zirconium silicate ($ZrSiO_4$), alumina ($Al_2O_3$), mullite ($3Al_2O_3.2SiO_2$), and niobium oxide ($Nb_2O_3$).

14. The glass composite material according to claim 13, wherein the ceramic or ass beads is one of the zirconium phosphate tungstate ($Zr_2(WO_4)(PO_4)_2$) and the quartz glass ($SiO_2$); and a content of the ceramic is equal to or more than 30 vol %, and equal to or less than 60 vol %.

15. A glass paste containing the glass composite material according to claim 11, a binder, and a solvent.

16. The glass paste according to claim 15, wherein polypropylene carbonate is used for forming the binder, and dihydroterpineol is used for forming the solvent.

17. A sealing structure body made of the glass composite material according to claim 11, including an inner space and a sealing part which isolates at least a part of the boundary between the inner space and the outside, having an inner space, the sealing structure body comprising a sealing part made of the glass composite material according to claim 11, the sealing part isolating at least a part of a boundary between the inner space and the outside.

18. The sealing structure body according to claim 17, wherein the sealing structure body is in the form of a vacuum heat insulating multilayer glass panel, a display panel, or a package device.

\* \* \* \* \*